(12) United States Patent
Rittenhouse

(10) Patent No.: US 7,579,742 B1
(45) Date of Patent: *Aug. 25, 2009

(54) HIGH-EFFICIENCY PARALLEL-POLE MOLDED-MAGNETIC FLUX CHANNELS TRANSVERSE WOUND MOTOR-DYNAMO

(76) Inventor: Norman Rittenhouse, 1001 N. First St., Fairbury, IL (US) 61739

( * ) Notice: Subject to any disclaimer, the term of this patent is extended or adjusted under 35 U.S.C. 154(b) by 0 days.

This patent is subject to a terminal disclaimer.

(21) Appl. No.: 12/015,718

(22) Filed: Jan. 17, 2008

(51) Int. Cl.
*H02K 1/12* (2006.01)
*H02K 21/12* (2006.01)
(52) U.S. Cl. .................... 310/257; 310/43; 310/44
(58) Field of Classification Search ............ 310/42, 310/43, 49 R, 257, 156.08, 156.12–156.31, 310/44
See application file for complete search history.

(56) References Cited

U.S. PATENT DOCUMENTS

| | | | |
|---|---|---|---|
| 4,671,369 A | 6/1987 | Tiffin et al. | |
| 5,483,113 A * | 1/1996 | Sakuragi et al. | 310/67 R |
| 5,533,587 A | 7/1996 | Dow et al. | |
| 5,647,721 A | 7/1997 | Rohrbaugh | |
| 5,834,865 A | 11/1998 | Sugiura | |
| 5,861,695 A * | 1/1999 | Brassard | 310/156.43 |
| 6,044,921 A | 4/2000 | Lansberry | |
| 6,153,953 A * | 11/2000 | Isozaki et al. | 310/49 R |
| 6,220,377 B1 | 4/2001 | Lansberry | |
| 6,259,176 B1 | 7/2001 | Isozaki et al. | |
| 6,325,167 B1 | 12/2001 | Jiang | |
| 6,435,292 B2 | 8/2002 | Lemke et al. | |
| 6,860,571 B2 | 3/2005 | Scheetz | |
| 2001/0001993 A1 | 5/2001 | Lemke et al. | |
| 2003/0116364 A1 | 6/2003 | Simmons | |
| 2003/0116366 A1 | 6/2003 | Simmons | |
| 2003/0127258 A1 | 7/2003 | Lansberry | |
| 2004/0168837 A1 | 9/2004 | Michaud et al. | |
| 2006/0208602 A1* | 9/2006 | Enomoto et al. | 310/257 |

* cited by examiner

*Primary Examiner*—Tran N Nguyen
(74) *Attorney, Agent, or Firm*—Brian S. Steinberger; Phyllis K. Wood; Law Offices of Brian S. Steinberger, P.A.

(57) ABSTRACT

A motor/dynamo including a mounting shaft having a hollow channel and a bearing attached to each end, a non-rotating cylindrical hub having a hollow core for the mounting shaft, single or plural rows of plural parallel pole molded magnetic flux channels each having two halves and forming a hollow channel through which wire is transversely wound through fixedly attached on a surface of the cylindrical hub forming a high efficiency, high torque, direct drive motor/dynamo, utilizing Parallel Pole Molded Magnetic Flux Channels, low resistance and impedance transverse coil windings, and physically separate stators for electrical phases. The high torque, high efficiency motor capable of driving wheels, tracks, propellers, and other loads without a gearbox or other torque multiplying device. The high efficiency dynamo capable of being directly driven by wind turbines without a speed increasing gearbox or other speed multiplying device.

32 Claims, 20 Drawing Sheets

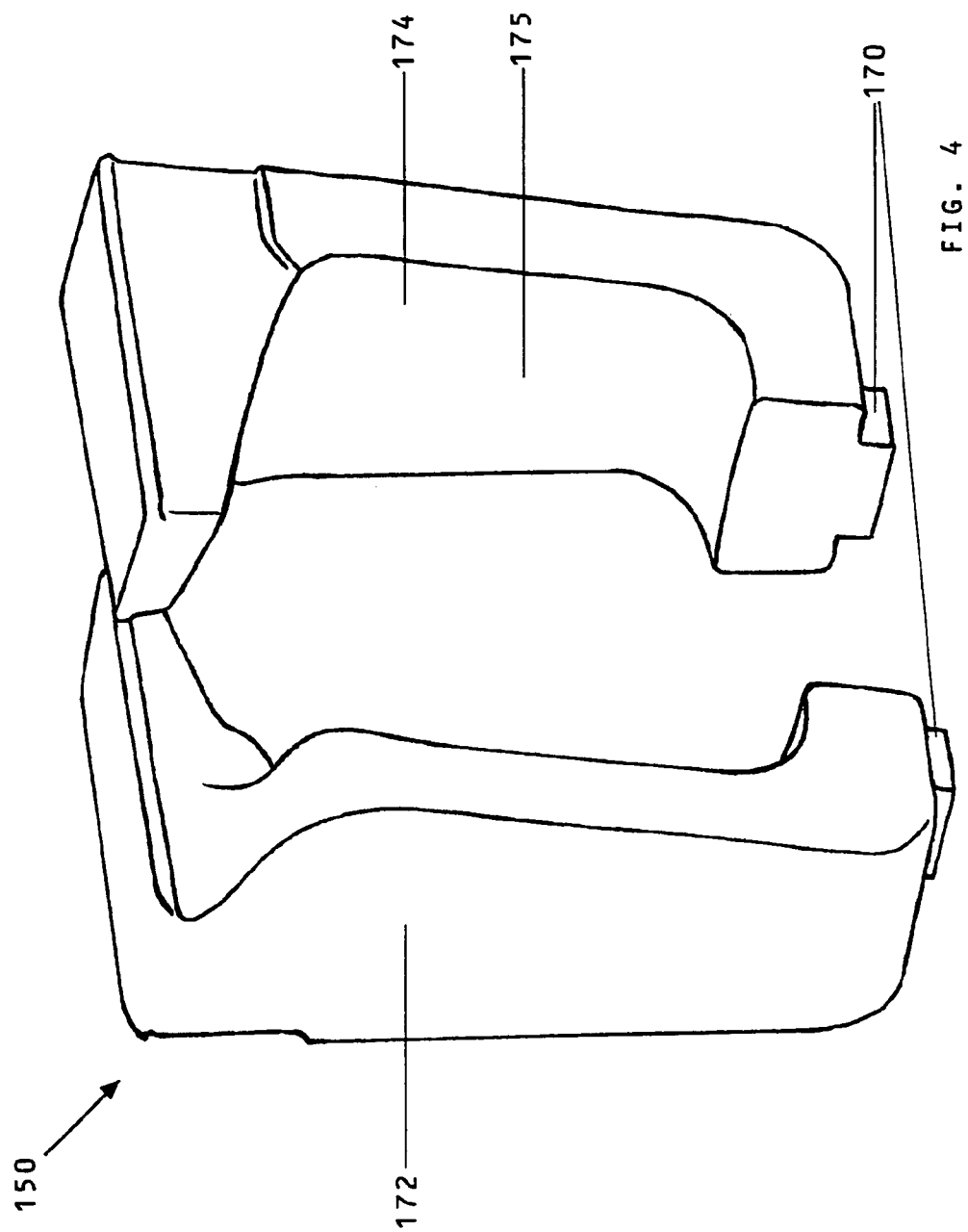

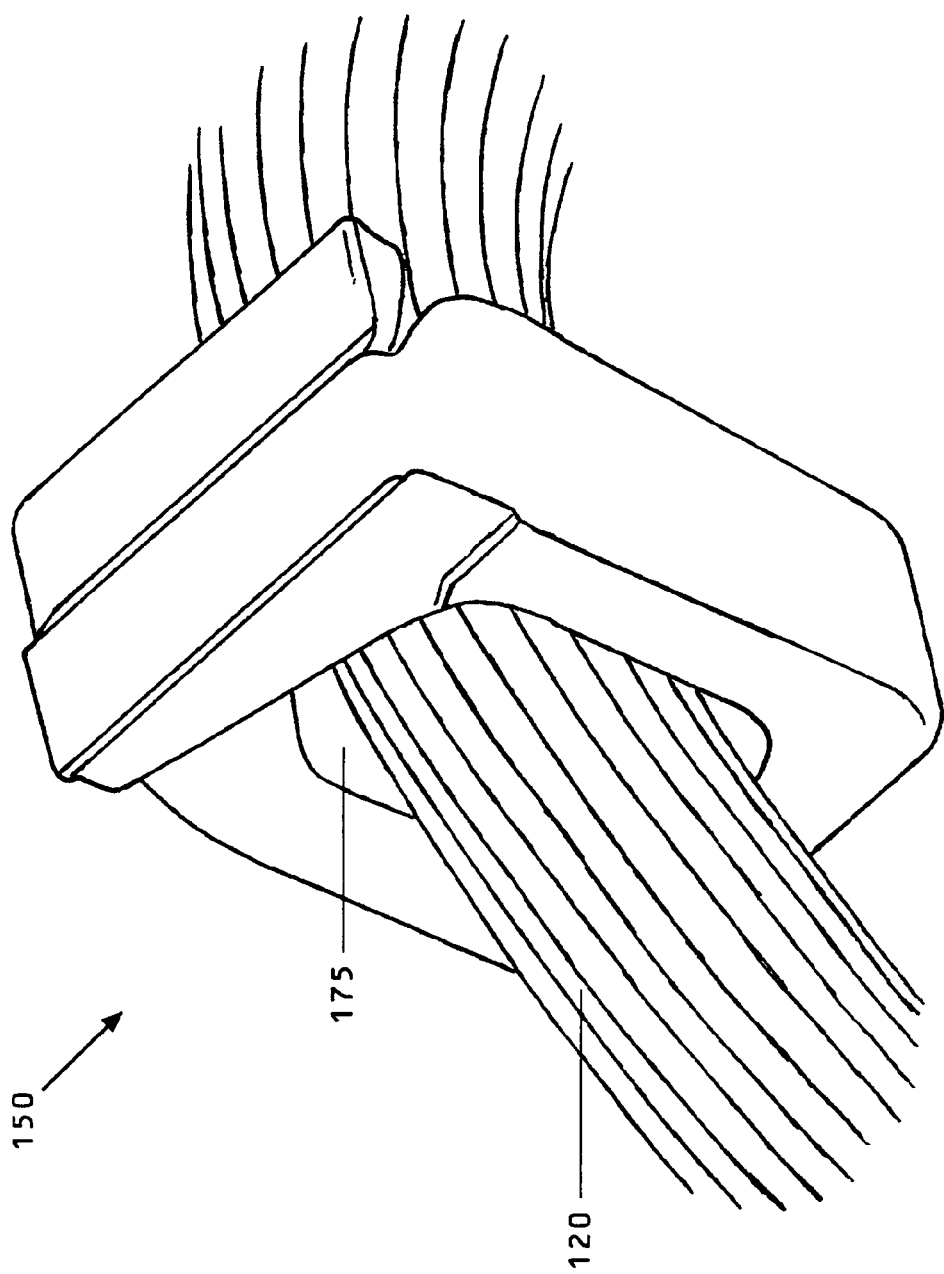

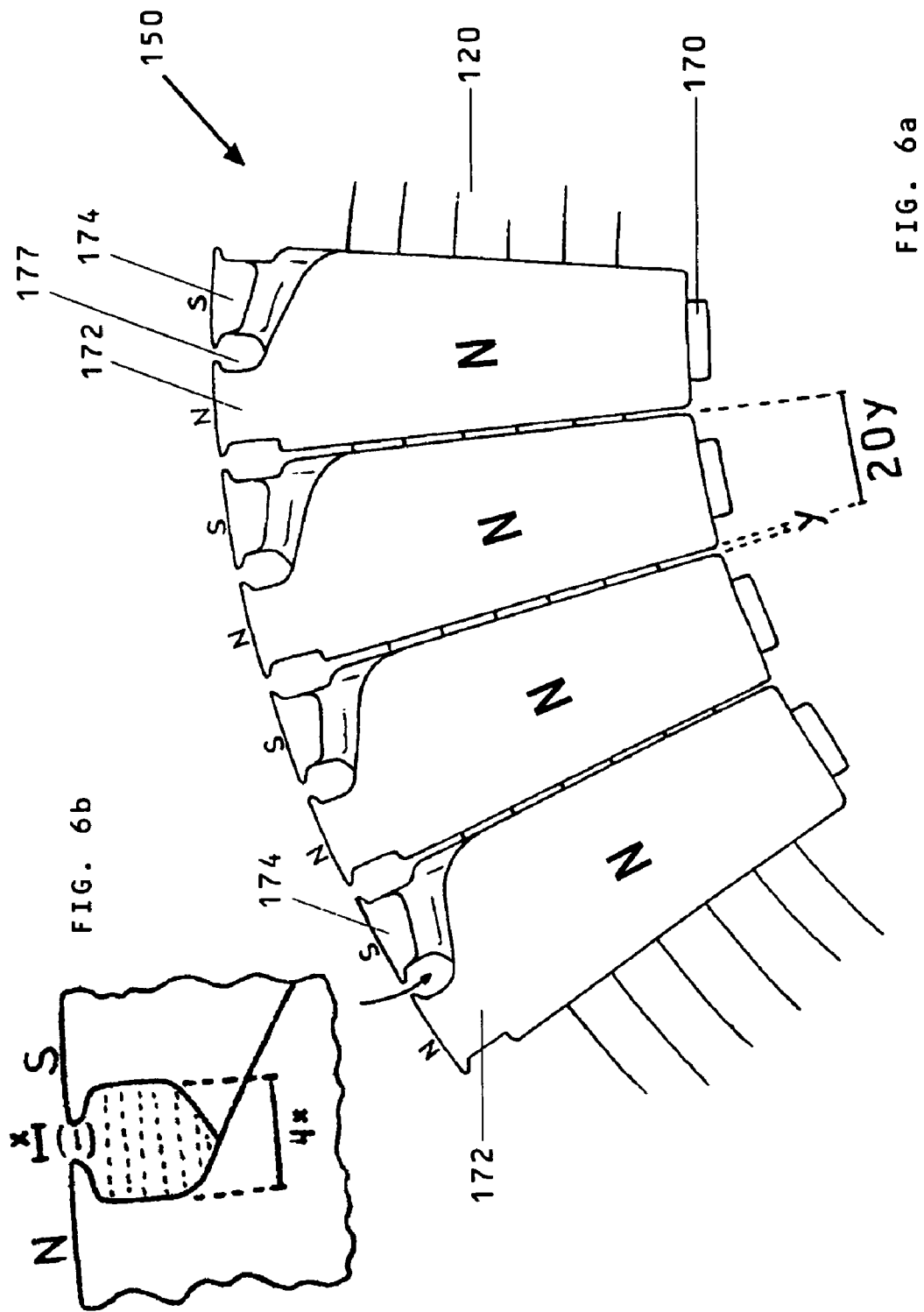

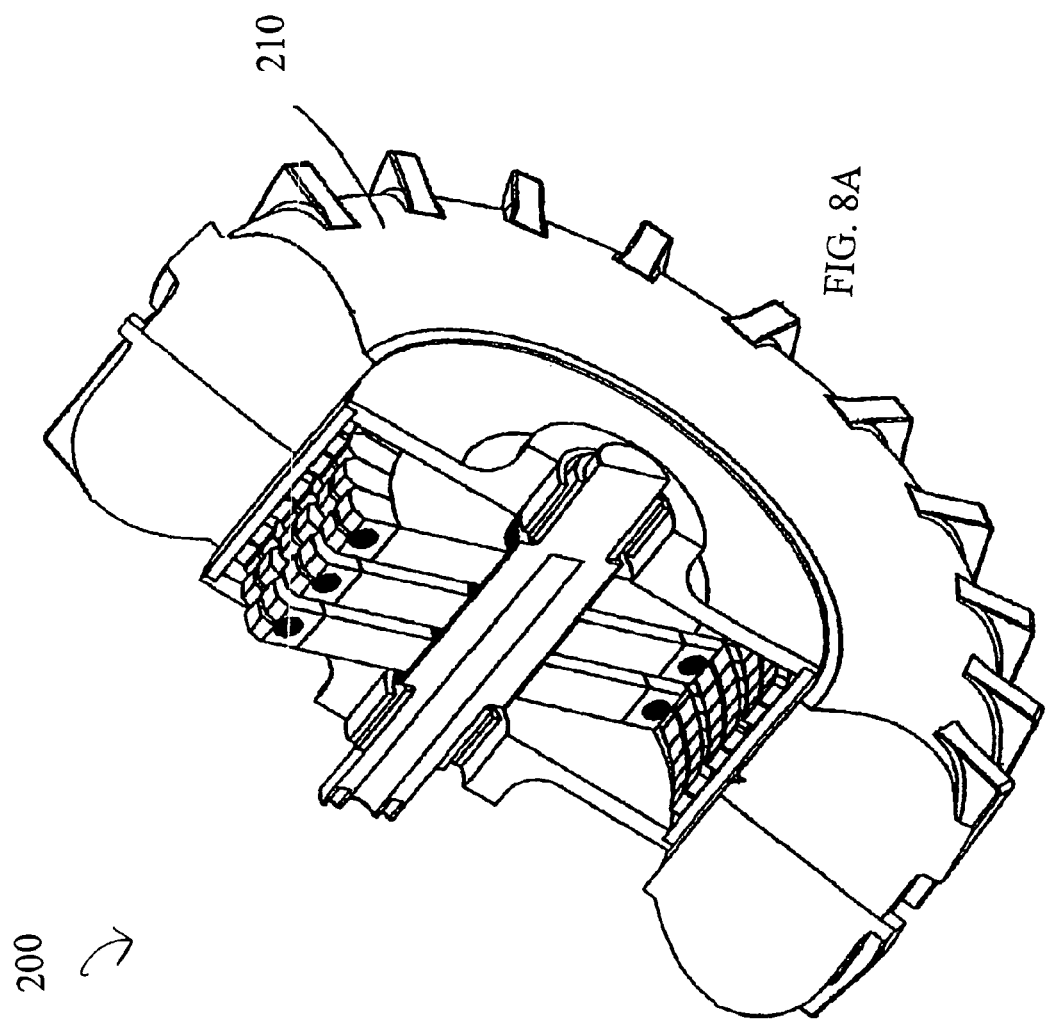

HIGH-EFFICIENCY PARALLEL-POLE MOLDED-MAGNETIC FLUX CHANNELS TRANSVERSE WOUND MOTOR-DYNAMO

FIELD OF THE INVENTION

This invention relates to motors and, in particular, to methods, systems, apparatus, and devices for a high efficiency direct drive high torque motor utilizing parallel pole molded magnetic flux channels with transverse flux stator windings, and separate stators for each phase.

BACKGROUND AND PRIOR ART

Approximately 93% of motors constructed use iron cores, or variations thereof, to concentrate magnetic flux and boost torque. "Coreless" motors are suited for very high RPM's with low torque and iron core motors usually utilize insulated steel laminations in their stators, which reduce heat losses from eddy currents. However, even with thinner laminations, the eddy currents are only blocked in one plane. So to further reduce eddy current losses, silicon is typically added to the steel to reduce its electrical conductivity. Although the silicon reduces some remaining eddy current losses (by reducing the current conductivity), the addition of silicon actually worsens the magnetic conductivity. This reduction of magnetic strength reduces the maximum amount of torque produced, and also reduces electrical efficiency.

Most prior art multi-phase motors use phase windings radially sequenced around the plane of rotation. The close-coupled proximity results in "Armature Effect" which reduces efficiency at higher speeds. The usual multi-phase high-speed motors also require a gearbox or other loss prone speed-reducing device in order to boost torque. Additionally, conventional motors use some variation of axial or radial flux, with multiple salient windings wound around iron type cores. Although this boosts magnetic flux, it also increases inductance and electrical resistance, and reactance. At higher speeds, the inductive and reactive losses limit top speed and efficiency at high speed.

Known prior art direct drive motors include U.S. Pat. No. 4,625,392 issued to Stokes on Dec. 2, 1986 titled Method of Manufacturing a Molded Rotatable Assembly for Dynamoelectric Motors, describes molding a rotor of a motor from magnetic material. However, it does not involve Transverse Flux and does not use molded material for the stator.

U.S. Pat. No. 4,853,567 titled Direct Drive Motor issued on Aug. 1, 1989, which describes a three-phase outer rotor motor. However, it uses conventional configuration with the three phase windings sequentially located within the same axis, and does not use Transverse Flux.

U.S. Pat. No. 5,777,413 issued to Lange et al. on Jul. 7, 1999 titled Transverse Flux Motor with Magnetic Floor Gap, describes a locomotive motor with Transverse Flux. However, it uses conventional iron laminations as its flux path, and is mainly concerned with physically flattening the motor to allow it to fit into the space between the floor of the locomotive and the train axle.

Prior art transverse Flux motors have historically been too costly to construct, and have rarely been used. This invention simplifies construction and lowers costs of Transverse Flux motors, and at the same time increases electrical efficiency to a higher level than before.

The motor of the present invention overcomes a problem with prior art motors by using separate, independent, uncoupled planes for each phase, as well as phase and pulse timing to eliminate the "Armature Effect" which results is much higher efficiency at higher speed. The novel motor also has very high torque and can drive directly most loads (such as vehicle tracks, wheels, or propellers) without requiring clutches, gearboxes, or other speed reducing devices. The result is greater efficiency, lower costs, and fewer moving parts.

The present invention also overcomes prior problems associated with boosting magnetic flux, which increases inductance and reactance and at higher speeds, the inductive losses limit top speed and efficiency at high speed. The direct drive motor of the present invention can use radial flux construction, but the preferred embodiment is Transverse Flux construction. In Transverse Flux construction, one large single winding powers each phase. Because magnetic flux is directly proportional to Ampere-Turns, the same magnetic flux can be achieved with more turns with less amperage, or higher amperage and fewer turns. In the preferred embodiment, this novel motor has fewer turns, and higher amperages. With fewer turns, the inductance is less, and with larger copper conductors the electrical resistance is less also. Since the inductance and resistance are reduced, both the inductive losses and the resistive losses are greatly reduced which results in higher efficiency and also a much higher usable speed range.

SUMMARY OF THE INVENTION

A primary objective of the invention is to provide apparatus, methods, systems, and devices for a very high efficiency direct drive high torque motor utilizing Parallel Pole Molded Magnetic Flux Channels with Transverse Stator Windings.

A secondary objective of the invention is to provide apparatus, methods, systems, and devices for a high efficiency direct drive high torque motor constructed using Parallel Pole Molded Magnetic Flux Channels, which increases the overall efficiency by greatly reducing eddy currents in all planes.

A third objective of the invention is to provide new apparatus, methods, systems, and devices for a high efficiency direct drive high torque motor using Parallel Pole Molded Magnetic Flux Channels to reduce cost, and make possible more magnetically efficient shapes which results in higher overall efficiency.

A fourth objective of the invention is to provide new apparatus, methods, systems, and devices for a high efficiency direct drive high torque motor that uses radial flux construction, but the preferred embodiment is Transverse Flux construction. In Transverse Flux construction, one large single winding powers each phase. This reduces the complexity and losses typically encountered with multiple salient type windings.

A fifth objective of the invention is to provide new apparatus methods, systems, and devices for a high efficiency direct drive high torque motor with fewer turns, and higher amperages. With fewer turns, the inductance is less, and with larger copper or aluminum windings the electrical resistance is less also. Since the inductance and resistance can be much less, both the inductive losses and the resistive losses are greatly reduced. The result is higher efficiency and also a much greater usable speed range.

A sixth objective of the invention is to provide new apparatus, methods, systems, and devices for a Transverse Flux motor having a simplified construction and lowers costs, and at the same time increases electrical efficiency to a higher level than the prior art.

A seventh objective of the invention is to provide new apparatus, methods, systems, and devices for a Transverse Flux motor that does not have external magnetic fields and produces negligible radio-frequency RF noise.

An eighth objective of the invention is to provide new apparatus, methods, systems, and devices for a Transverse Flux motor for use as a wheel motor. A tubeless tire can be mounted on the rotor drum and the tubeless tire can be partially filled with a liquid coolant that then cools the rotor drum and attached permanent magnets.

A ninth objective of the invention is to provide new apparatus, methods, systems, and devices for a Transverse Flux motor, using Parallel Pole Molded Magnetic Flux Channels and separate stators for each phase, having sufficient torque to directly power track wheels, wheel motors, marine propellers, or wind turbines.

A tenth objective of the invention is to provide new apparatus, methods, systems, and devices for a Transverse Flux motor for use as a high efficiency motor, high efficiency generator, or a dynamo. The motor may also be used as a synchronous motor.

The present invention overcomes the problems with the prior art and provides a motor that achieves high efficiency (98% demonstrated) and has the following advantages:

1. Near Elimination of eddy current loses in stator.

2. Greatly reduced hysteresis losses in stator.

3. Significant reduction of conductor resistive (IR) losses.

4. Reduction of inductive losses.

5. Elimination of phase "armature effect" losses.

6. Elimination of previously required mechanical or hydraulic power transmission losses, previously necessary to achieve high torque with low RPM.

7. Reduced complexity and lowered cost of construction of Transverse Flux Motors.

A first preferred embodiment of the invention provides a motor comprised of a mounting shaft having a hollow channel and a bearing attached to each end of the mounting shaft, a non-rotating cylindrical hub having a hollow core for the mounting shaft, plural rows of plural Parallel Pole Molded Magnetic Flux Channels each, comprised of two halves, forming a hollow channel which conductive wire is transversely wound through. Each complete Parallel Pole Molded Magnetic Flux Channels fixedly attached on a cylindrical surface of the cylindrical hub. Each one of the plural rows corresponding to a phase of the motor, wherein each one of the plural magnetic flux channels forms two parallel pole pieces, North and South. Plural phase windings, one of the plural transverse windings passing through one of the rows of plural magnetic flux channels and corresponding to one phase, a rotating drum having plural paired rows of plural permanent magnets on an inner surface, each paired row corresponding to and aligned with one of the plural rows of molded magnetic flux channels, the rotating drum connected with the bearing to allow the plural rows of permanent magnets to rotate around the cylindrical hub, and drive electronics for driving the plural phase windings with variable timing advance and current pulse shaping, wherein the plural molded magnetic flux channels capture nearly all the available magnetic flux of the transverse winding which increases torque and motor efficiency.

Further objects and advantages of this invention will be apparent from the following detailed description of preferred embodiments that are illustrated schematically in the accompanying drawings.

BRIEF DESCRIPTION OF THE FIGURES

FIG. 4 is a perspective exploded view of a Parallel Pole Molded Magnetic Flux Channel showing the copper or aluminum winding tunnel, the two parallel pole pieces and the locating pin.

FIG. 5 is another perspective view of a Parallel Pole Molded Magnetic Flux Channel of FIG. 4 from a different angle, with the transversely wound conductive wire running through the winding tunnel.

FIG. 6a is a side view of four consecutive Parallel Pole Molded Magnetic Flux Channels with transversely wound conductive wire being run through the winding tunnel.

FIG. 6b is an exploded view showing the magnetic flux in the air gap between a north and a south pole of a magnet.

FIG. 8a is a cross sectional perspective view of a wheel motor according to an embodiment of the present invention.

FIG. 10b shows another example of the drive electronics shown in FIG. 10a.

DESCRIPTION OF THE PREFERRED EMBODIMENTS

Figure 1:
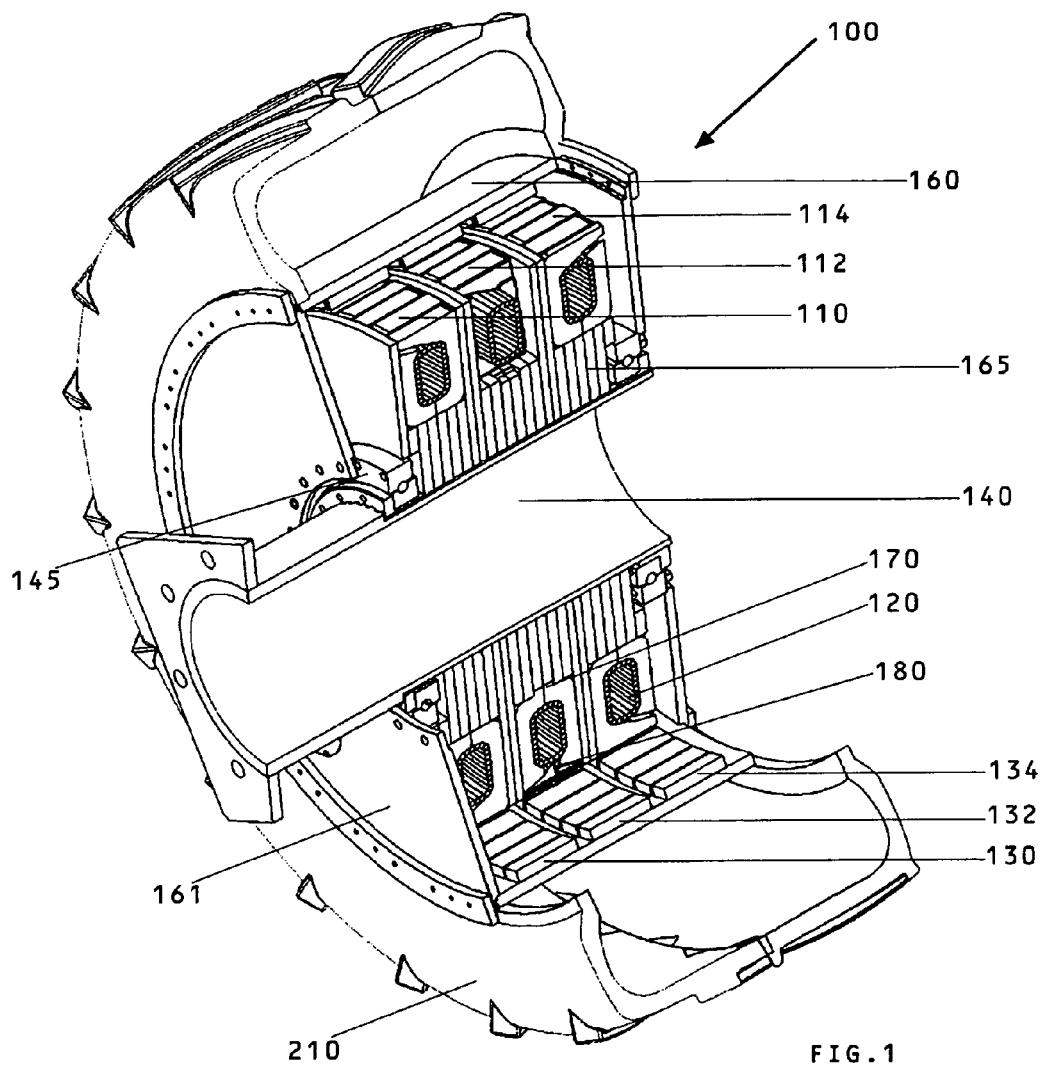
FIG. 1 is a cross sectional perspective drawing of a wheel motor having three phases according to the present invention.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The following is a list of the reference numbers used in the drawings and the detailed specification to identify components:

| 100 | motor |
|---|---|
| 110 | pole pieces, phase "A" |
| 112 | pole pieces, phase "B" |
| 114 | pole pieces, phase "C" |
| 120 | transverse wire winding |
| 130 | row of magnets, Phase "A" |
| 132 | row of magnets, Phase "B" |
| 134 | row of magnets, Phase "C" |
| 136 | epoxy |
| 140 | mounting shaft |
| 145 | bearing |
| 150 | Magnetic Flux Channels |
| 160 | magnetic drum outer shell |
| 161 | rotating side plate |
| 162 | mounting shaft hole |
| 165 | hub |
| 170 | locating key |
| 172 | north parallel pole piece |
| 174 | south parallel pole piece |
| 175 | hollow core |
| 177 | gap |
| 180 | air gap |
| 200 | wheel motor |
| 210 | tire |
| 220 | location ridge |
| 222 | machined axial flat |
| 224 | epoxy powdered iron binder |
| 300 | track wheel |

The method, system, apparatus, and device of the present invention provides a high efficiency, direct drive, high torque motor utilizing Parallel Pole Molded Magnetic Flux Channels with transverse windings, with separate stator assemblies for each phase. One separate stator for each phase increases available magnetic flux and magnetic flux area.

According to the present invention, the motor can be either stator outside or rotor outside and the motor utilizes separate multiple phase windings. In a preferred embodiment, the motor includes at least three phases. FIG. 1 is a cross sectional perspective view of a direct drive high torque motor having three phases according to a preferred embodiment of the present invention. As shown, the direct drive motor 100 includes three phases A, B and C each having plural Parallel Pole Molded Magnetic Flux Channels that form plural pairs of pole pieces 110, 112 and 114 with a copper or aluminum transverse winding 120A, 120B and 120C and magnet rings 130, 132 and 134 corresponding to each phase A, B and C, respectively, that are fixedly attached on an interior surface of a rotating drum 160.

Figure 12A:
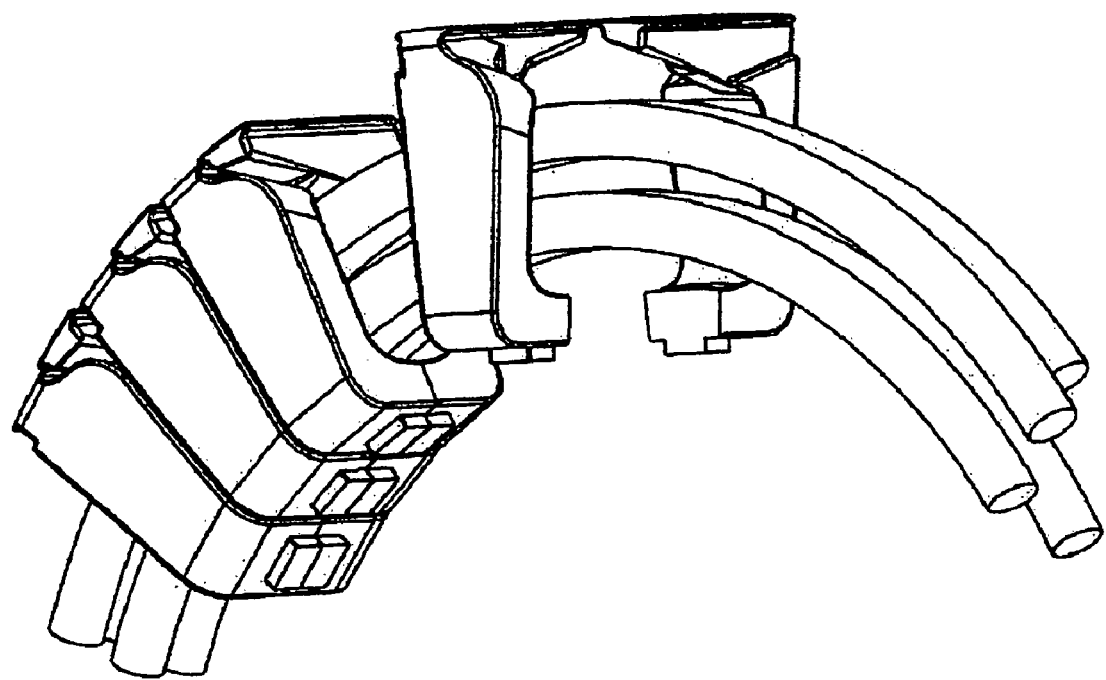
FIG. 12a shows a dual, identical transverse windings in each stator phase allowing dual voltage operation.
Figure 12B:
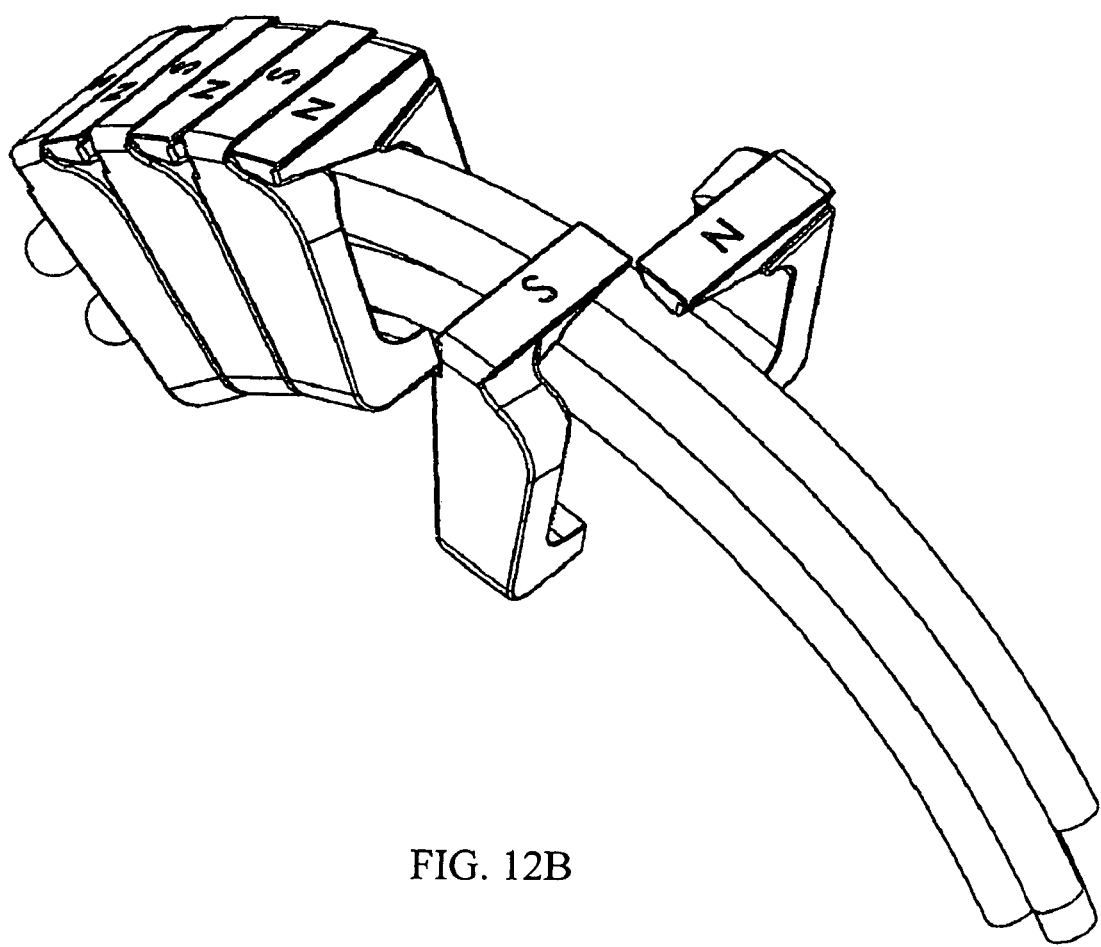
FIG. 12b shows transverse wound locomotive wire that allow fewer turns, higher amperages, with more flexible wire for easier construction and higher efficiency.

A shown in FIG. 12a, each the phase winding can include dual, identical transverse windings in each stator phase allowing dual voltage operation, and also allowing series start, parallel run operation utilizing connection switching in either motor or dynamo mode. In another embodiment shown in FIG. 12b, each transverse winding comprises: transverse wound locomotive wire, allowing fewer turns, higher amperages, with more flexible wire for easier construction and higher efficiency.

The Parallel Pole Molded Magnetic Flux Channels replace conventional laminated silicon steel as the flux-concentrating device. The Parallel Pole Molded Magnetic Flux Channels, in combination with the improved magnetic shapes captures and delivers more available flux to the parallel pole pieces. Additionally, the high precision molded part decreases construction cost of transverse flux motors.

The pole pieces 110, 112 and 114 are fixedly attached to a hub attached to center non rotating mounting shaft 140 having bearings 145 around each end of the non-rotating mounting shaft 140. Each phase corresponds to one single row of pole pieces and one row of permanent magnets. Permanent magnets are placed in one row alternating north and south poles for each phase. For example, phase A includes north and south pole pieces 110 which are coupled with one single row of magnets 130 that are mounted on the interior surface of the rotating drum 160. The non-rotating mounting shaft 140 may be hollow for routing power cables, signal cables, or both. In an alternative embodiment, the hollow non-rotating mounting shaft 140 also includes liquid or air coolant lines.

Figure 2:
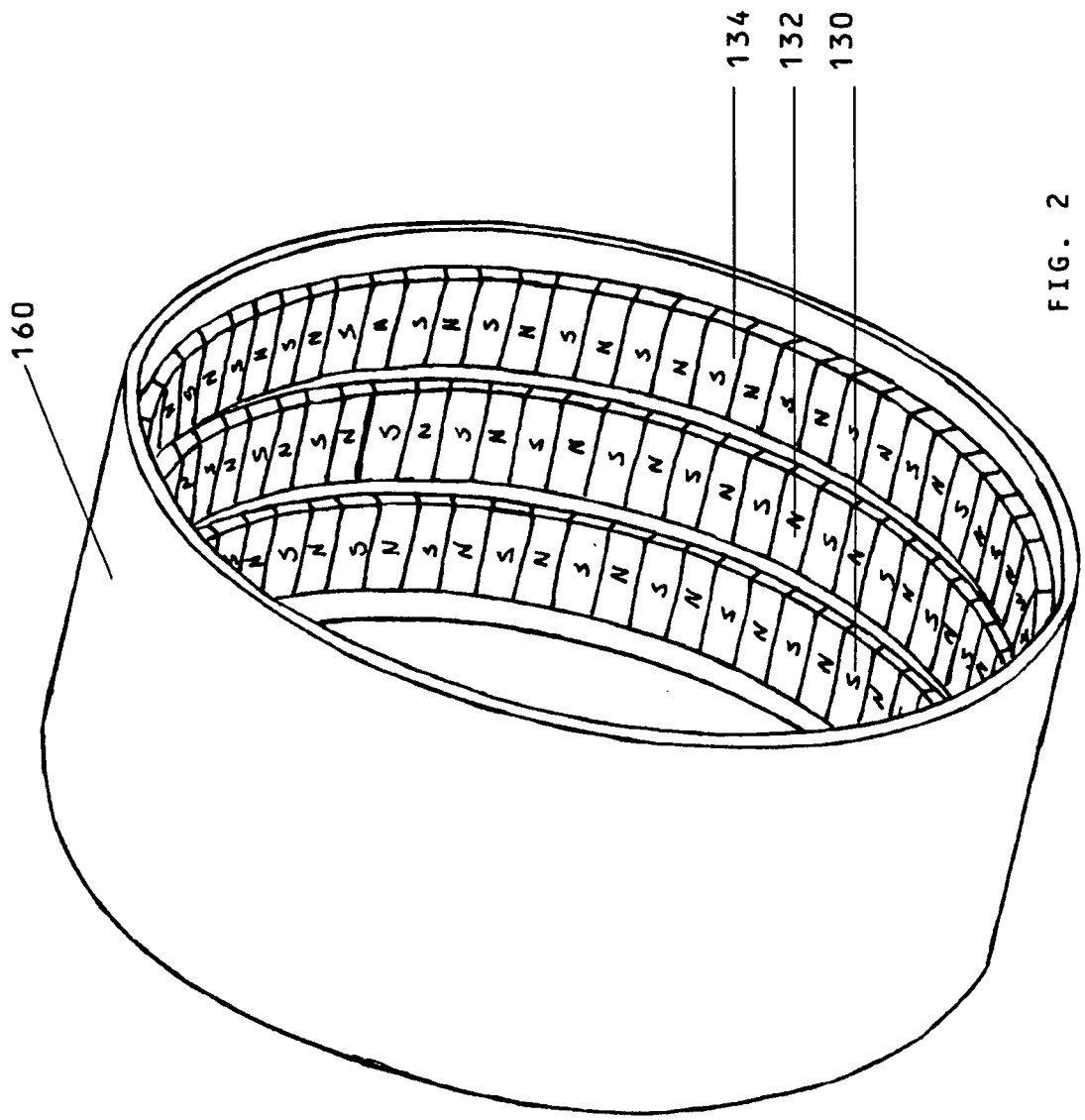
FIG. 2 is a perspective side view of the outer rotor shell, showing one row of magnets alternating North and South for each phase of the motor.

FIG. 2 shows a perspective view of the interior surface of the rotating drum 160. As shown, each phase includes one single row of permanent magnets that alternate between north and south poles. The drum to which the permanent magnets are attached is the main moving part, which increases the reliability of the motor. In an embodiment, the motor is sealed from external elements. With appropriate seals, the motor can be used underwater.

Figure 9:
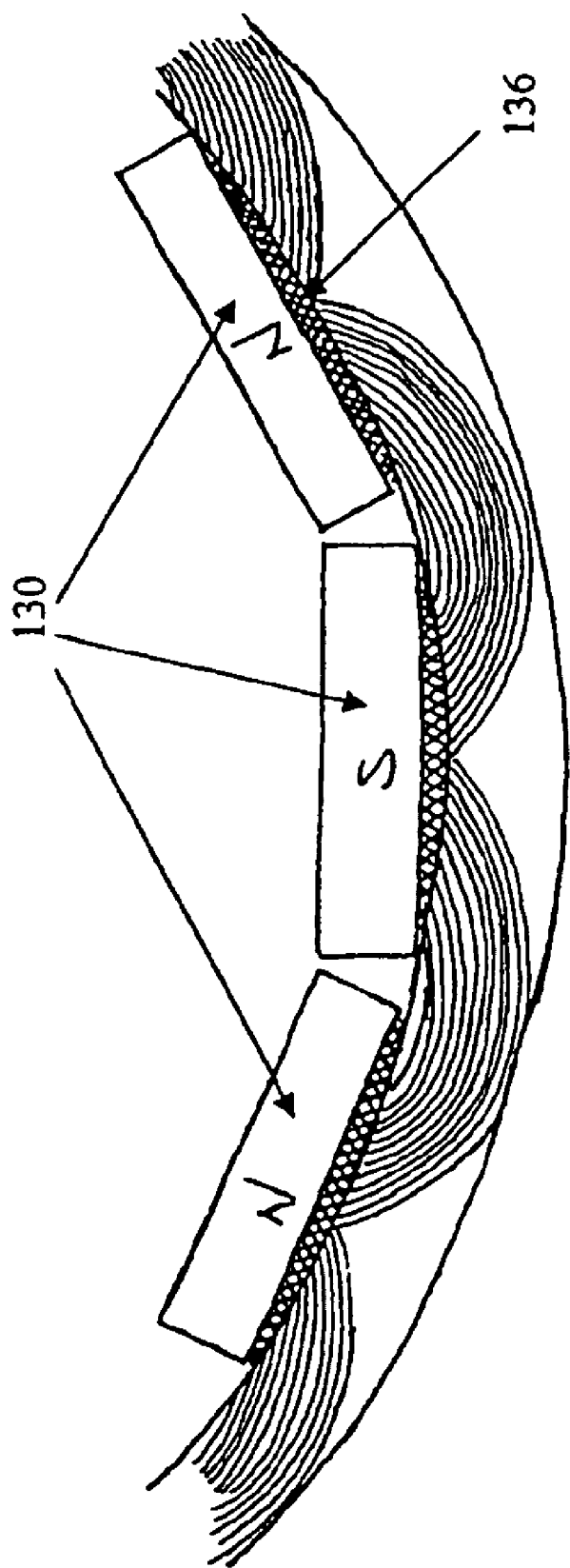
FIG. 9 shows another example of the flat magnet back bonded with epoxy containing powdered iron to reduce the magnetic air gap between the plural permanent magnets and the inner surface of the rotating drum.

Preferred empowerment of rotor outside construction allows permanent magnets 130 to be bonded with special epoxy 136 containing powdered iron as shown in FIG. 9 to reduce the magnetic air gap between the outer surface of the permanent magnets and the inner surface of the outer steel housing to permit more economical construction by allowing the use of flat magnets rather than requiring the more expensive radially curved magnets. The one row of permanent magnets for each phase enhances the transverse flux design by eliminating the complexity of the return flux circuit elements required in prior art systems, which improves torque, efficiency and reduces demagnetizing flux leakage or fringing.

The motor uses any even high number of poles, eight or more, and in a preferred embodiment, the motor includes between 32 and 360 or more poles. Increasing the number of poles result in higher torque at lower speeds. In the preferred embodiment, two or more phases may be used with each phase having a separate radial circle of Parallel Pole Molded Flux Channels and its energizing coil. Typically, three or more phases are used, with higher numbers giving increased running torque and less cogging torque.

Increased efficiency of the motor is achieved by physically separating each phase winding, parallel pole molded magnetic flux channels and poles, and permanent magnets, from the other phase windings, and associated parts.

Figure 3A:
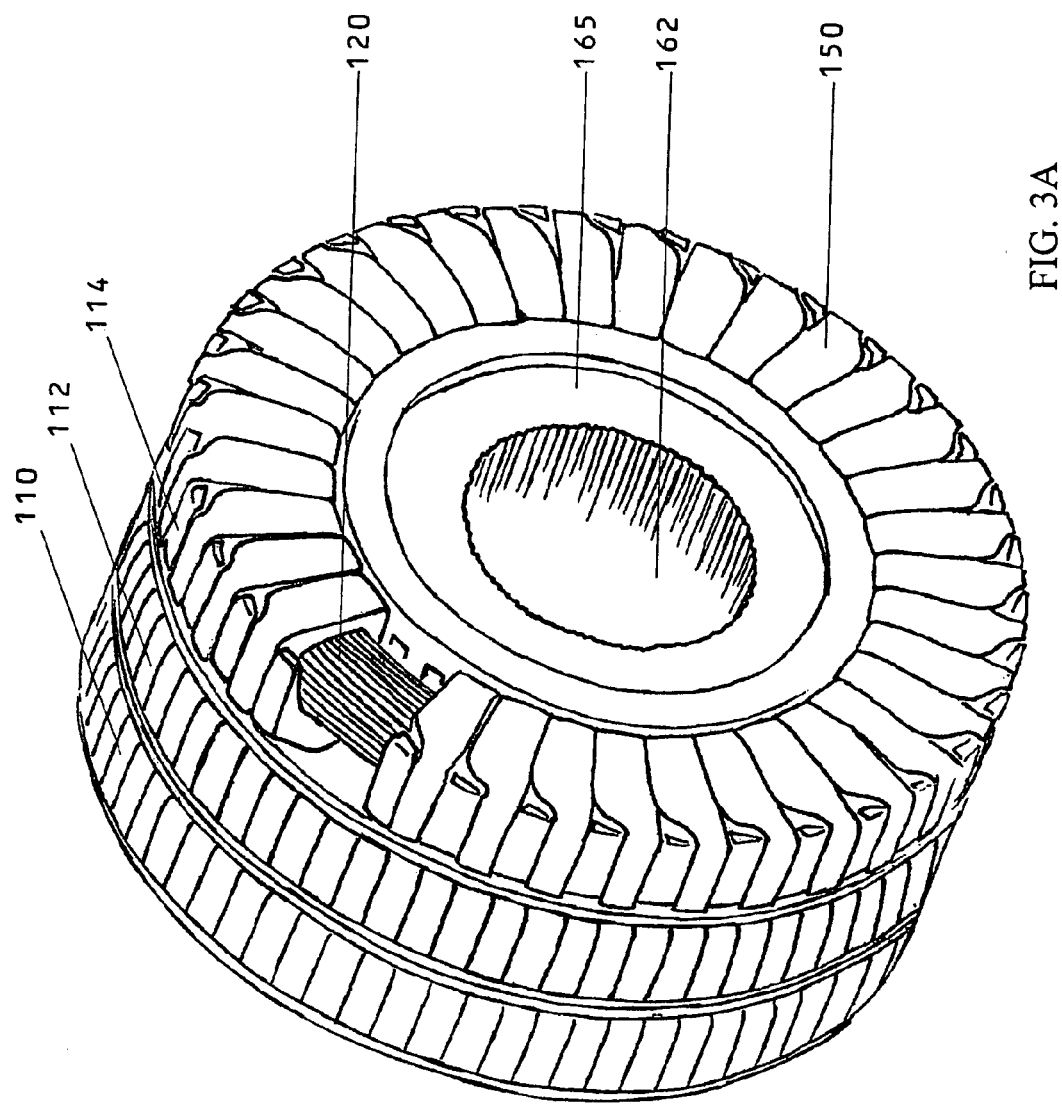
FIG. 3a is a perspective side view of an example of a three-phase assembly showing multiple Parallel Pole Molded Flux Channels mounted to a fiberglass hub, with several Flux Channels removed to show the transversely wound copper or aluminum winding.
Figure 3B:
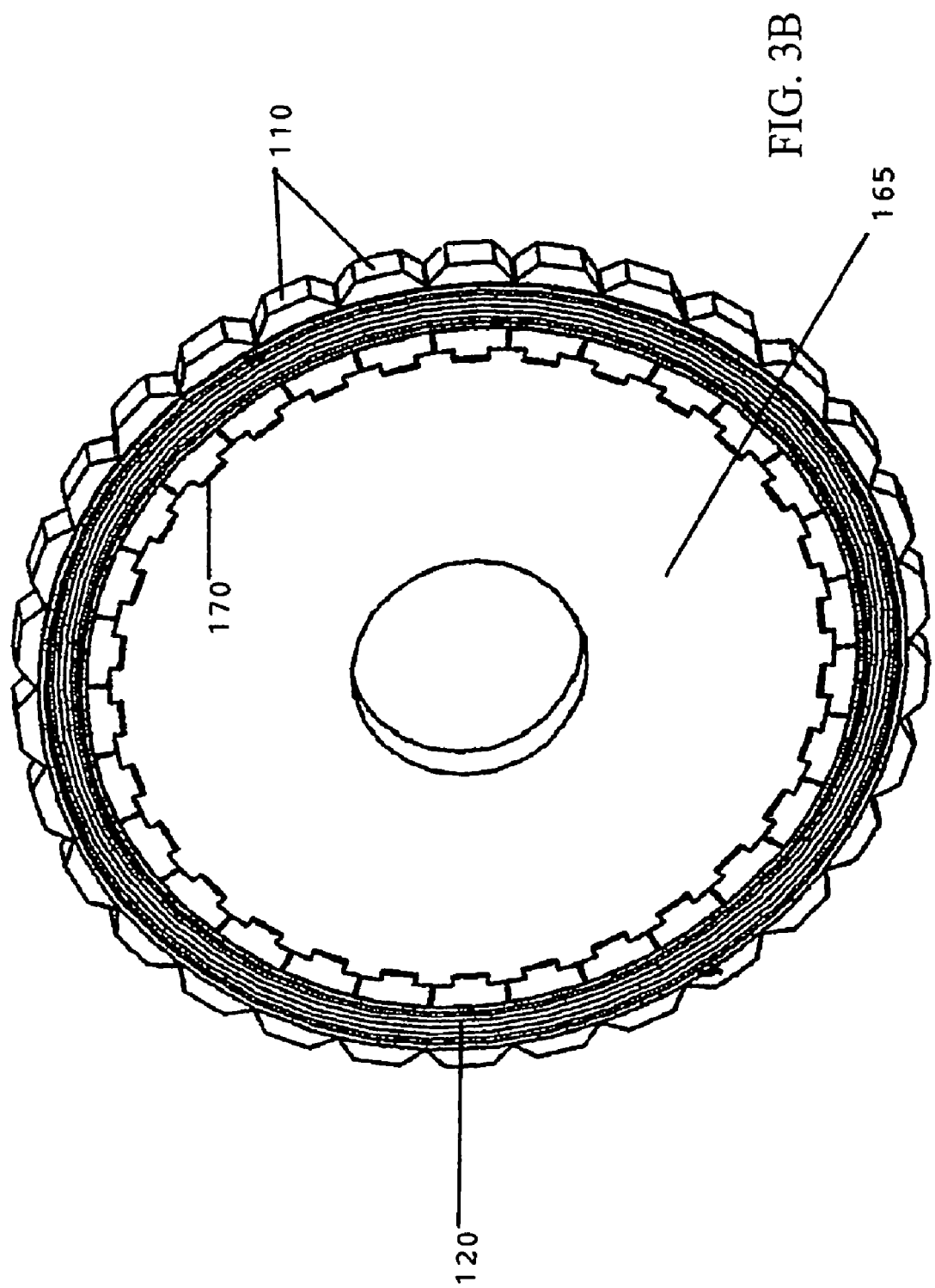
FIG. 3b is a cross sectional perspective side view (cut in half) of the same example—the single phase assembly showing the Molded Magnetic Flux Channels, the fiberglass hub and the single phase copper winding.

FIG. 3a is a perspective side view of the Parallel Pole Molded Magnetic Flux Channels 150 attached to a hub 165. In a preferred embodiment the hub is fiberglass although alternative non-magnetic, non-conductive materials may be substituted. As shown, there are plural Parallel Pole Molded Magnetic Flux Channels 150 around the outer edge of the fiberglass hub 165 with a shaft mounting hole 162 in the center. Fabrication of the non-rotating hub with non-conductive, non-magnetic material eliminates eddy currents in the hub and reduces the weight of the motor. FIG. 3*b* is a cross sectional perspective side view of the single phase assembly showing the molded magnetic flux channels, the fiberglass hub and the single phase copper winding.

In one embodiment, the non-rotating hub 165 includes one disc for each phase; alternatively, the molded magnetic flux channels for all of the phases are mounted on one larger non-magnetic, non-conductive cylinder. FIG. 3 also has several parallel pole molded magnetic flux channels removed to show the transverse winding 120 located inside the Parallel Pole Molded Magnetic Flux Channels 150 that are attached to the hub 165. As shown, the molded magnetic flux channels contain a curved tunnel for housing the transverse flux producing coil winding. Losses due to interconnection splices between individual stator coils are eliminated due to the elimination of multiple coils per phase. Each phase coil has a minimum of two terminals or a larger number for voltage taps or series/parallel connection. In an alternative embodiment, the parallel pole molded magnetic flux channels also include non-conductive coolant lines or hollow coils for direct circulation of coolant.

Typical IR losses are greatly reduced by replacing multiple conventional salient windings used in prior art motors with one continuous coil of large diameter wire. Using one coil winding per phase winding also reduces typical inductive losses. The configuration of the present invention practically eliminates stray flux lines by substantially surrounding the phase coil winding 120 with parallel pole molded magnetic flux channels 150, which conduct the captured flux directly to the individual parallel pole molded pole pieces. Additionally, transverse windings with molded magnetic flux channels eliminate internal connections, splices and efficiency wasting circulating currents usually encountered with salient wound motors and eliminating salient wound coils eliminates wasted flux from wire end paths and reduces assembly costs. Coil winding costs are also reduced. Nearly all flux emitted from the transverse coil is captured and utilized to increase efficiency. The motor of the present invention has higher efficiency and higher torque than conventional salient wound radial flux or axial flux designs, and full torque is available from a dead stop to a high range of RPM's.

In a three-phase version of the present invention, either the stators may be offset 120 electrical degrees from each other with the magnets aligned or the motor magnets may be offset 120 electrical degrees from each other with the stators aligned. Separate Stators spaced at 120 electrical degrees for a three-phase motor, greatly reduces magnetic distortion usually called Armature Effect, which allows higher efficiency at higher speeds. Mechanically, the offset between phases depends on the number of poles per the following formula:

Offset=number of pole pairs/360×number of phases.

Thus for a 60 pole motor with three phases:

Offset=360/30=12 degrees divided by 3=4 degrees

FIG. 4 is a perspective side view of the Parallel Pole Molded Magnetic Flux Channel 150, and the winding which supplies the transverse flux. This configuration includes locating keys 170 corresponding to each adjacent molded magnetic flux channel. The locating keys 170 allow precision placement of the plural molded magnetic flux channels. Hysteresis losses in the stator are greatly reduced by elimination of typical laminated silicon iron, and construction of the Parallel Pole Molded Magnetic Flux Channels 150 of high permeability, high flux density conducting hard or soft ferrite materials, sintered iron-nickel alloy, amorphous alloys or similar molded products.

These molded magnetic flux channels may be constructed of materials such as ferrite, iron-nickel sintered alloy or can be fabricated with imbedded insulated iron wire bundles. Since the Molded Magnetic Flux Channels are electrically non-conductive of electrical current, eddy currents are virtually non-existent. The high permeability, low conductivity parallel pole molded magnetic flux channels increase torque and increase efficiency.

The preferred embodiment of the present invention eliminates eddy current and hysteresis losses in the stator hub by constructing the hub of non-conductive, non-metallic material such as fiberglass and eliminating bolts, clamps, nuts, clips, and other metal parts. Mounting the Molded Magnetic Flux Channels in magnetically inert material such as fiberglass eliminates hysteresis losses in the mounting core, reduces weight, increases insulation resistance, and reduces electromagnetic interference. The preferred embodiment of the stator also substantially eliminates core losses caused by eddy current, by eliminating conventional laminations and conventional pole pieces to carry the magnet lines of force. Another advantage of using the molded magnetic flux channels is reduction of eddy current heating losses.

A perspective view of a molded magnetic flux channel 150 that forms a pair of pole pieces 110 is shown in FIG. 4. Each magnetic flux channel 150 is molded to have a hollow core 175 for the transverse conductive winding 120. As shown, the molded-magnetic flux channel 150 includes two mating pole pieces, a north pole piece 172 and a south pole piece 174. When the current through the transverse winding reverses, the parallel poles switch magnetic polarity. On the exterior base of each pole piece is a portion of the locating key 170, which when mated form the locating key 170 that is used for mounting plural molded-magnetic flux channels 150 to the hub 165 as shown in FIG. 1. In an embodiment, the upper portion of the pole pieces is approximately twice the length of the bottom portion and top interior portion of the north and the south pole pieces are angled so that the entire length of the upper north pole piece 172 mates with the south pole piece as shown in FIG. 5 without contacting. In this embodiment, the base of each pole piece is approximately one-half the length of the upper portion so that then the north and south pole pieces are mated they form the channel 175 for the transverse winding 120 as shown in FIG. 5. The mirror image design of the north and south pole pieces permits easy assembly of stator by mating the halves of the molded-magnetic flux channel around the transverse winding, and also reduces the part count.

The shape of the flux member made possible with molded-magnetic flux channels maximizes the space between adjacent members of opposite magnetic polarity while maintaining approximately the same cross sectional area by increasing length of each top portion where the width is decreased to reduced magnetic flux leakage and fringing. Additionally, the magnetic leakage between pole pieces is reduced due to shape of undercut faces of poles. In another embodiment, the pole pieces are formed to include an air gap 177 between pole piece 150 and permanent magnet 130, 132 and 134. Unlike the prior art, the Parallel-Pole Molded Magnetic Flux Channel captures flux of each rotating magnet, rather than from every other magnet.

The shape of the mated flux channel allows the flux channel to surround of transverse conductor for transmitting the captured magnetic flux and focusing it at parallel pole pieces facing the rotating permanent magnets. The shape also allows efficient transference of magnetic flux from pole piece 172 and 174 to transverse conductor 120 without saturation of magnetic member 170 in Dynamo duty and the parallel-pole molded magnetic flux channel captures approximately all-available magnetic flux of the transverse conductor and efficiently conveys it to the parallel poles as a motor. Increasing the cross sectional area of the magnetic conductor area according to the desired magnetic flux density allows efficient transference of magnetic flux from the transverse conductor to the pole piece without saturation of the magnetic member. Since the magnetic flux channels are molded, modification of the mold allows the designer to design the parallel pole magnetic pole pieces to meet different specifications.

The advantages of the molded magnetic pole pieces of the present invention is not possible with the prior art construction using thin stamped sheets of iron, called laminations. In comparison, the molded magnetic flux channels allow the designer to modify the molded magnetic pole pieces to create shapes that are advantageous magnetically, which is not possible in the prior art using two dimension stamping.

Using the motor configuration of the present invention overcomes the problem of "Armature Reaction", by reducing the flux shift due to interaction of permanent magnets and flux of the stator which is a problem in prior art radially aligned phase motors. Another advantage of using this configuration is that there is no inter-reaction between phases as on conventional circuitry using sequenced stators and rotors. This allows near perfect timing of stator current to coincide with natural reverse EMF of stator by the simpler and more precise method of timing phase advance and current pulse waveform shaping and duration variation.

Figure 10A:
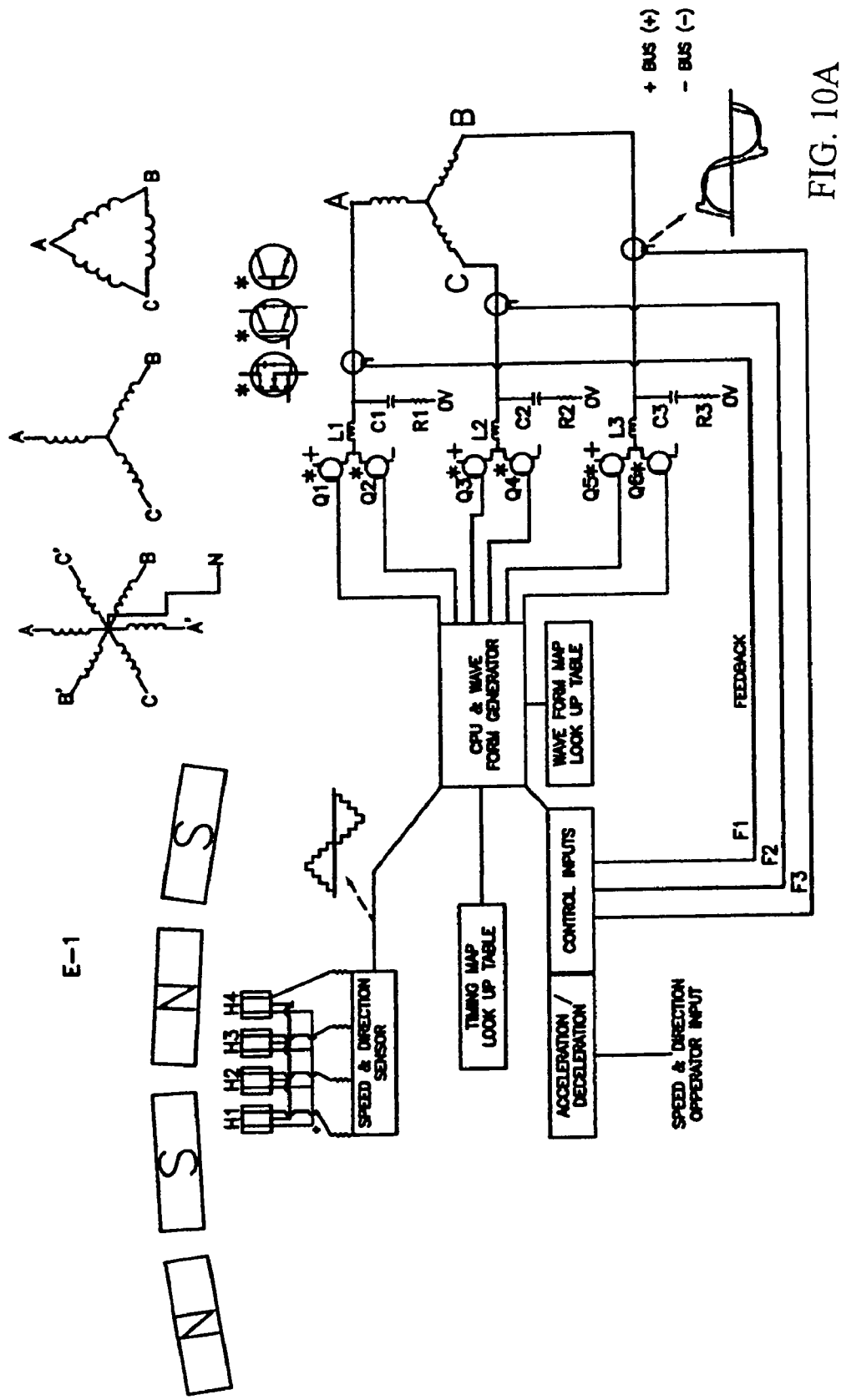
FIG. 10a shows an example of a WYE, STAR, or DELTA connection and a schematic diagram of a circuit using a WYE configured stator.
Figure 10B:
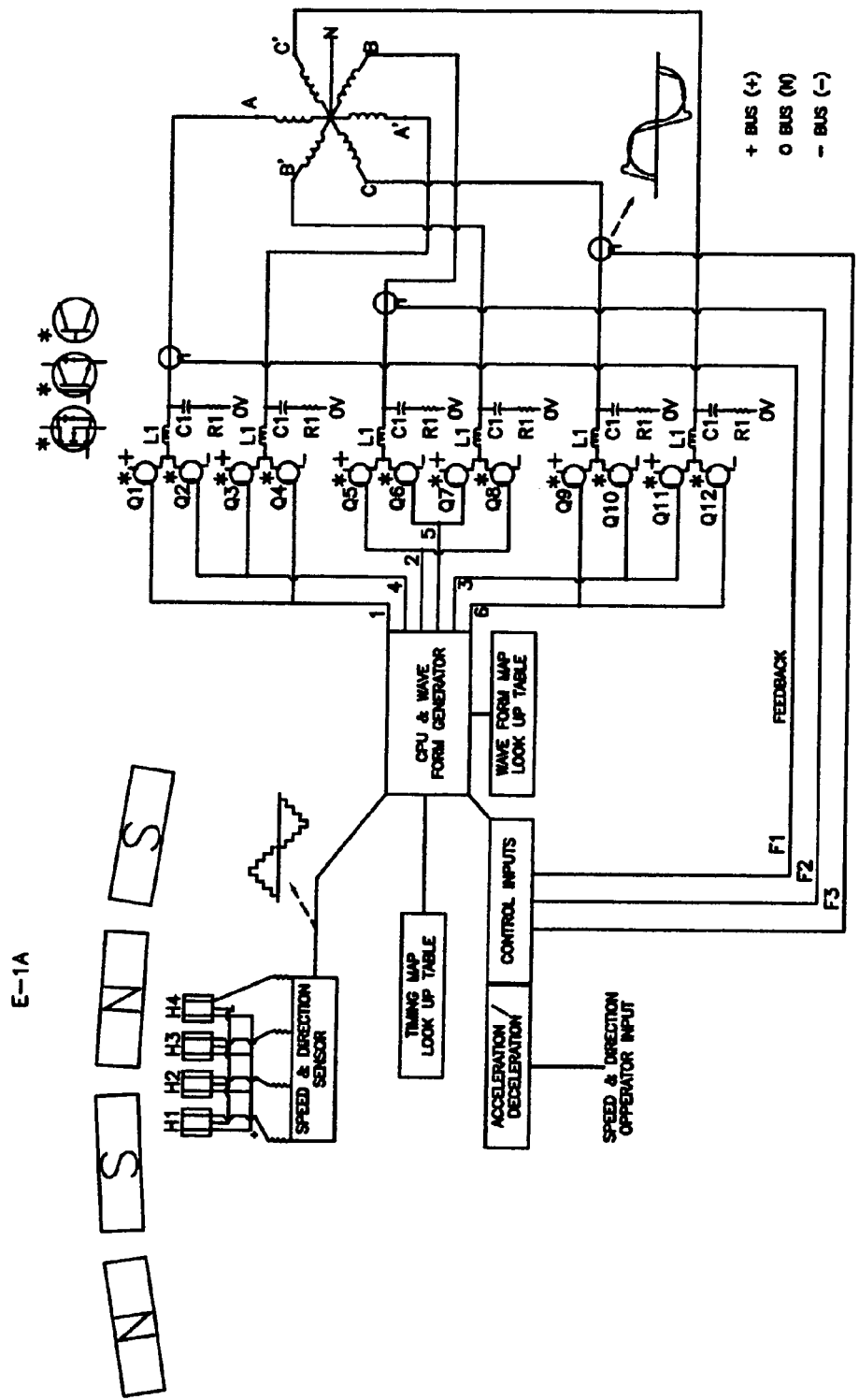
Figure 11A:
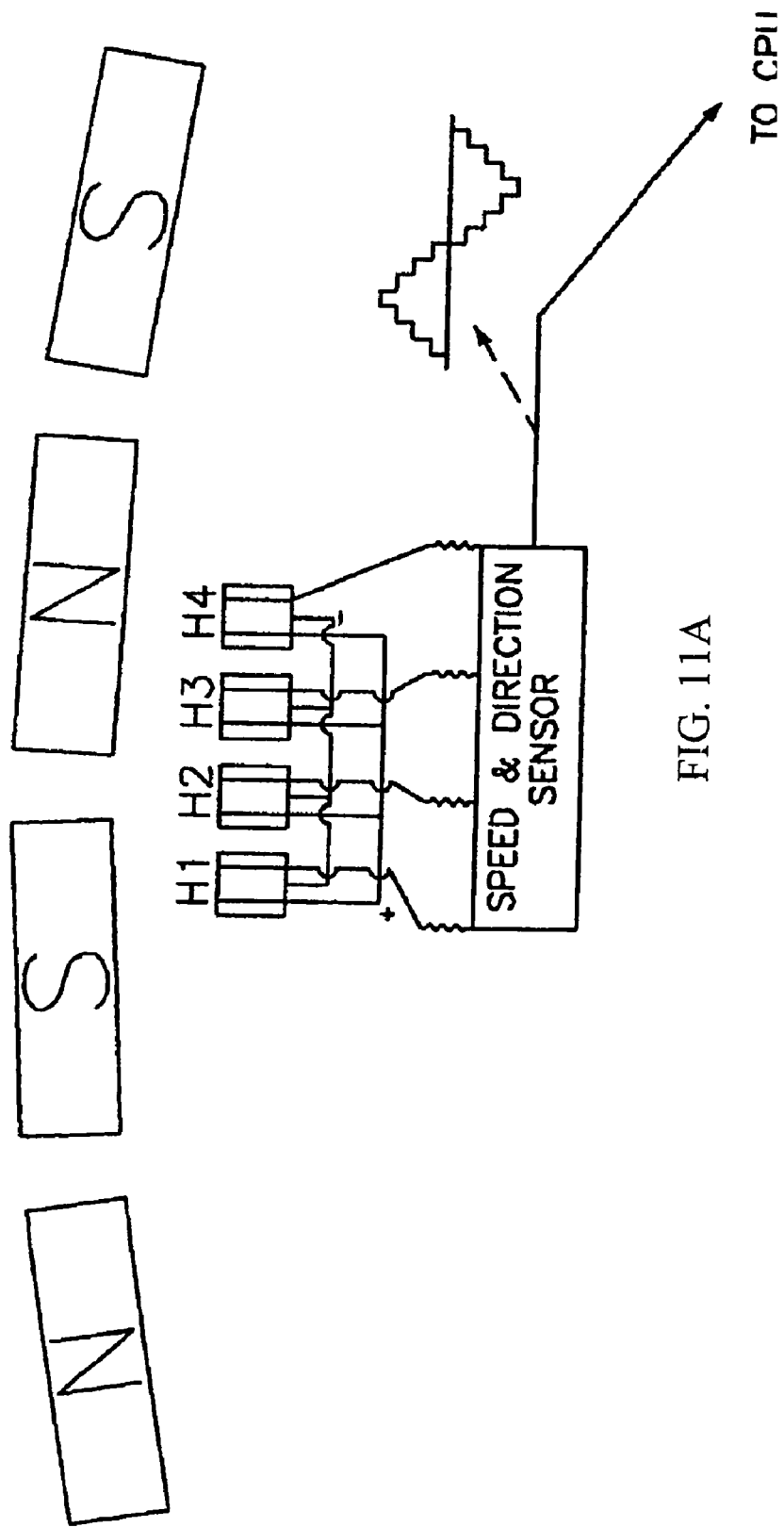
FIG. 11a is a schematic diagram showing the three-phase embodiment with 120 degrees spacing between modules.
Figure 11B:
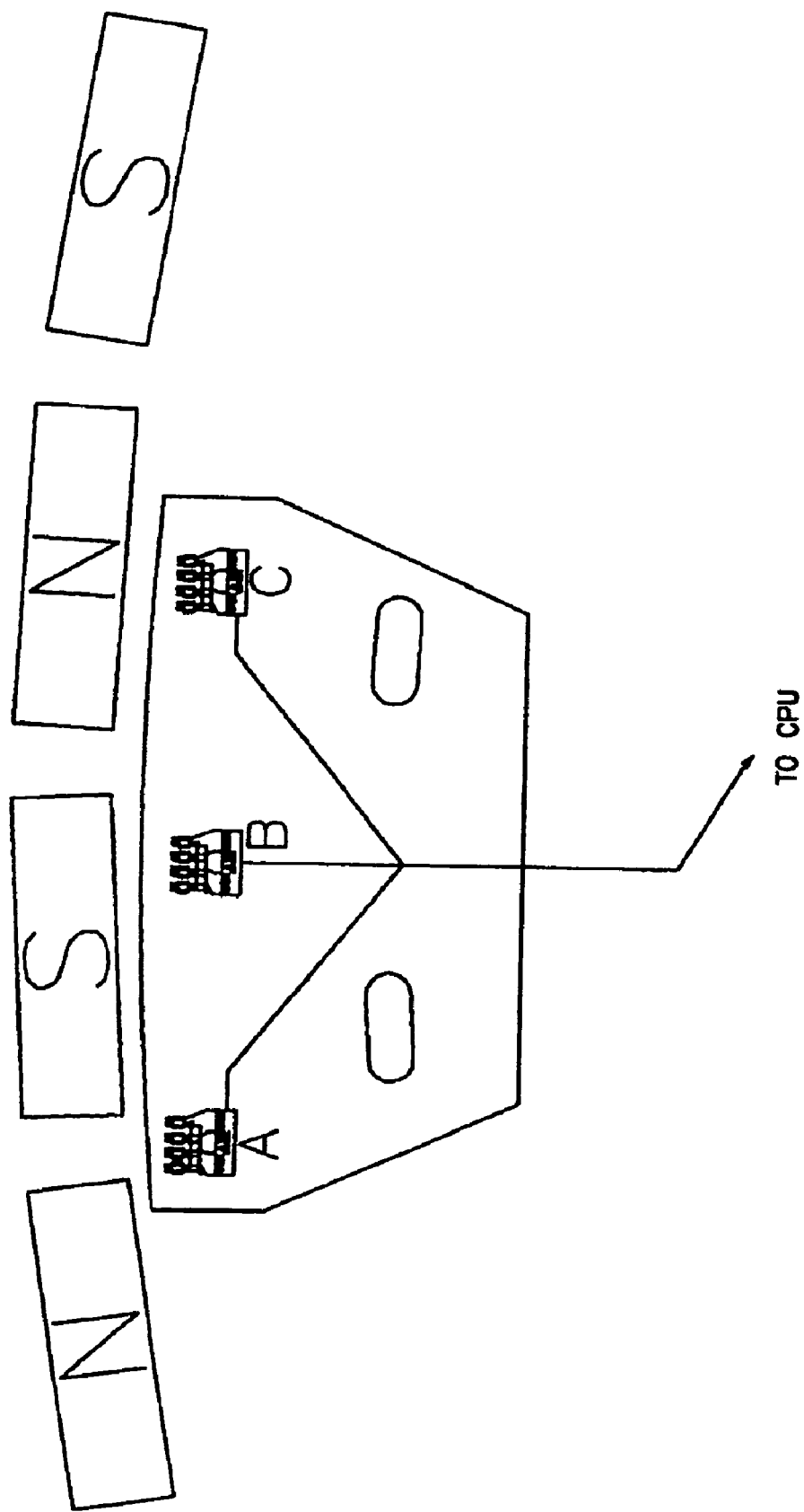
FIG. 11b is a schematic showing the three-phase embodiment with 120 degree spacing between modules and shows the timing, direction and speed magnetic flux detectors.

Phase windings may be individually driven by electronics, or may be WYE, STAR, or DELTA connected as shown in FIGS. 10*a* and 10*b*. In a preferred embodiment, each phase stator winding is separately driven by a square wave, sine wave, trapezoidal waveform, or a combination thereof from a motor full bridge power circuit, not shown. The parallel pole molded magnetic flux channels allow pole surface shapes to be properly shaped to control magnetic flux density to allow voltage waveforms to be sine wave, square wave, trapezoidal waveform, or a combination thereof as shown in FIGS. 10, 11*a* and 11*b*. Unlike prior art motors, it is not necessary to use six-step trapezoidal power to run the motor although this type excitation can be used. During high torque starting, DC may be applied to all phase coils simultaneously, except the one phase while the passing magnet polarity reverses.

In an embodiment, a cooling, non-metallic hollow tube may be wound in the rows of molded magnetic flux channels to carry away the IR heat generated by the coil windings. In very large motors, hollow coil conductors may be used for the same purpose, with liquid coolant circulated through the coils.

A preferred embodiment is the "Wheel Motor" 200 shown in FIG. 8. In this embodiment, one or more large tubeless tires 210 are mounted on the circumference of the outer rotor, and in a preferred embodiment, the tire 210 may be inflated with part liquid along with gas inflation. Rotation of the wheel motor 100 causes the liquid to cool the rotor of the motor and the permanent magnets. This allows the use of lower cost neodymium iron boron magnets rather than the more costly samarium cobalt magnets. It is well known that neodymium magnets must not be allowed to get too hot or they may lose magnetism.

Figure 8B:
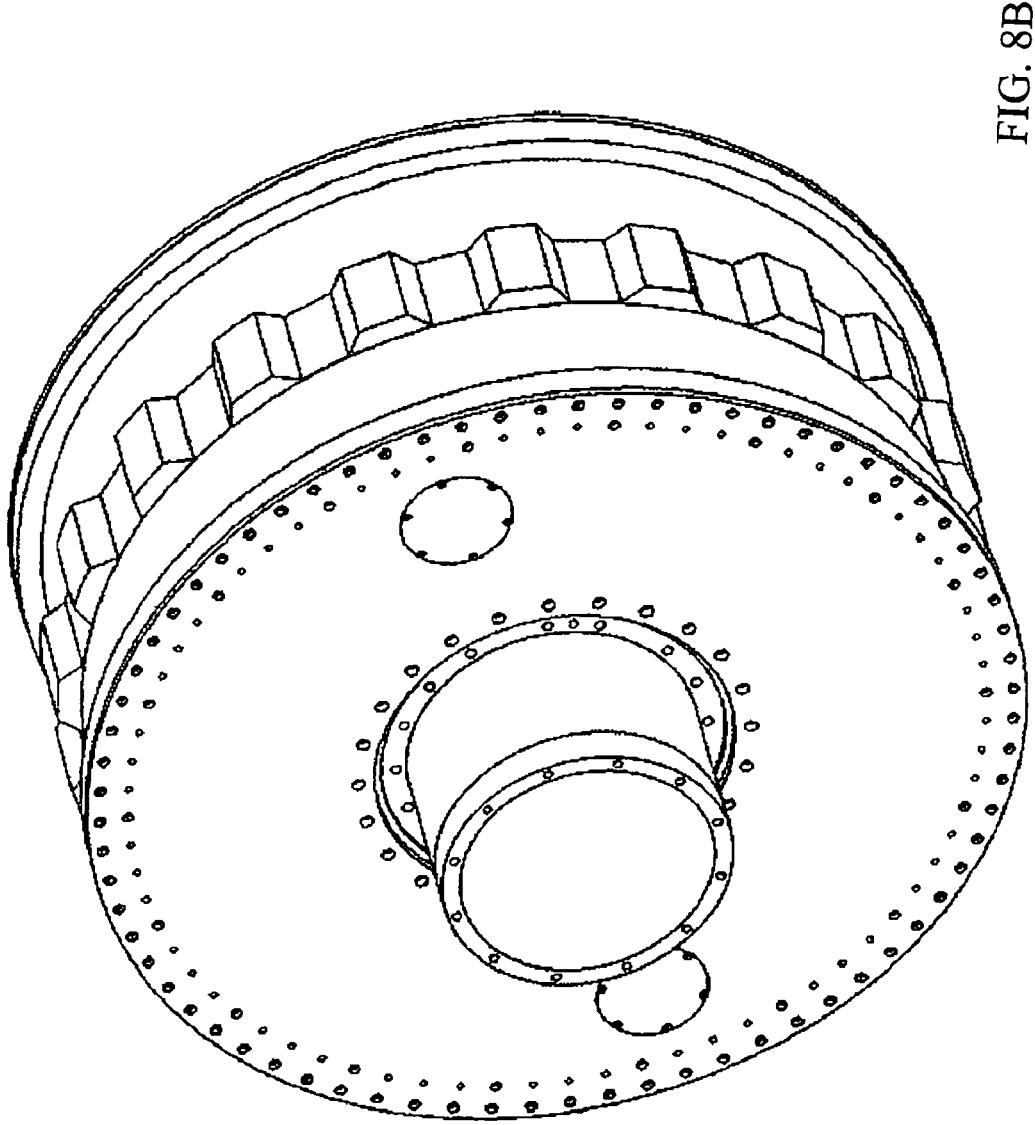
FIG. 8b is a perspective view showing a track driving surface mounted on the circumference of an outer surface of the rotating drum to form a track wheel motor.

In alternative embodiments the motor is used for a track wheel 300 or propeller hub motor is shown in FIG. 8*b*. Other alternative applications include using the motor in any motor requiring high torque at low RPM without gearboxes, such as but not limited to, augers, elevator motors, and garage door motors and as a direct drive wind turbine dynamo.

Figure 6C:
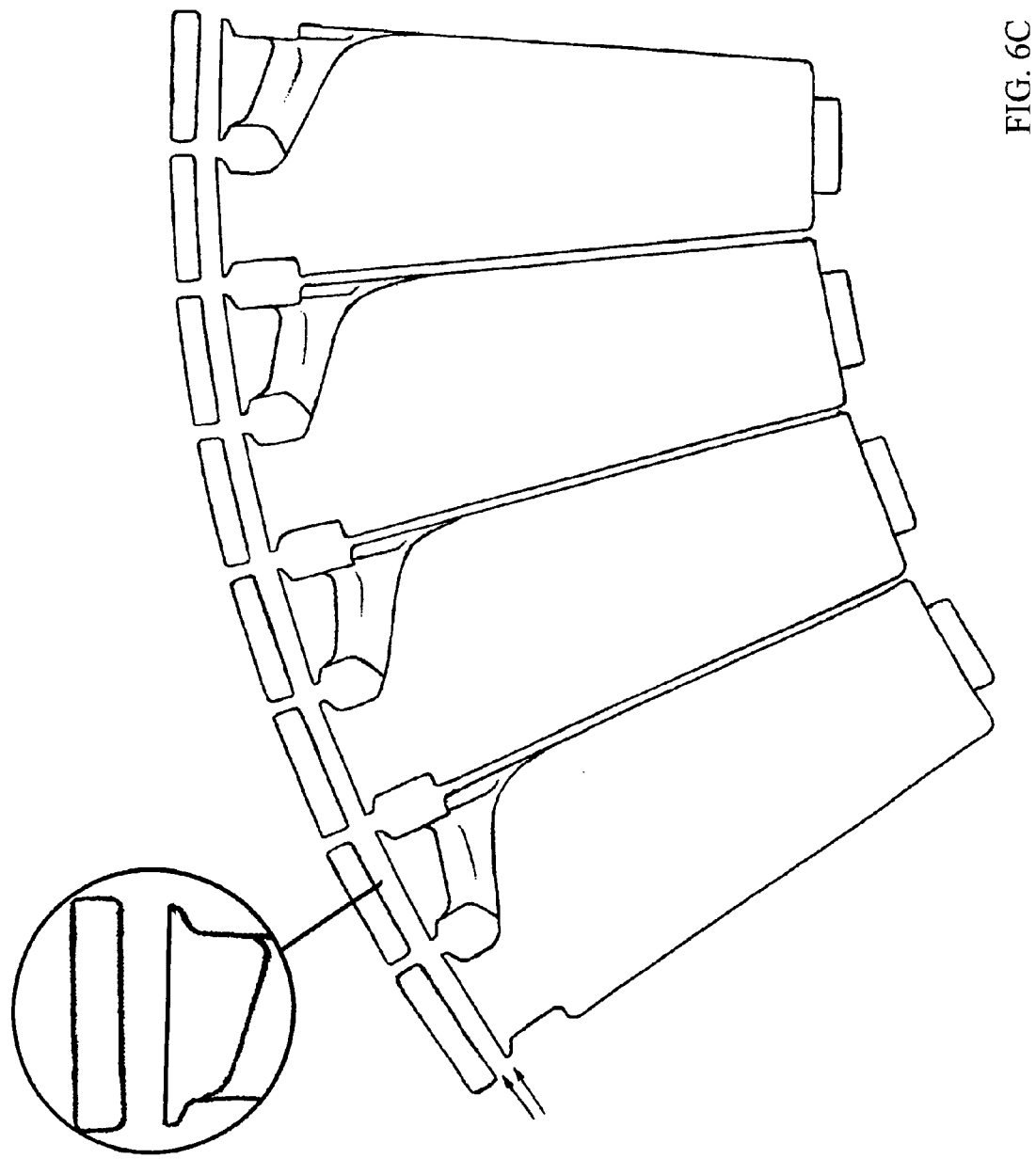
FIG. 6c is a side view of adjacent mated pole pieces and an exploded view showing the flat top surface of the pole pieces.
Figure 6D:
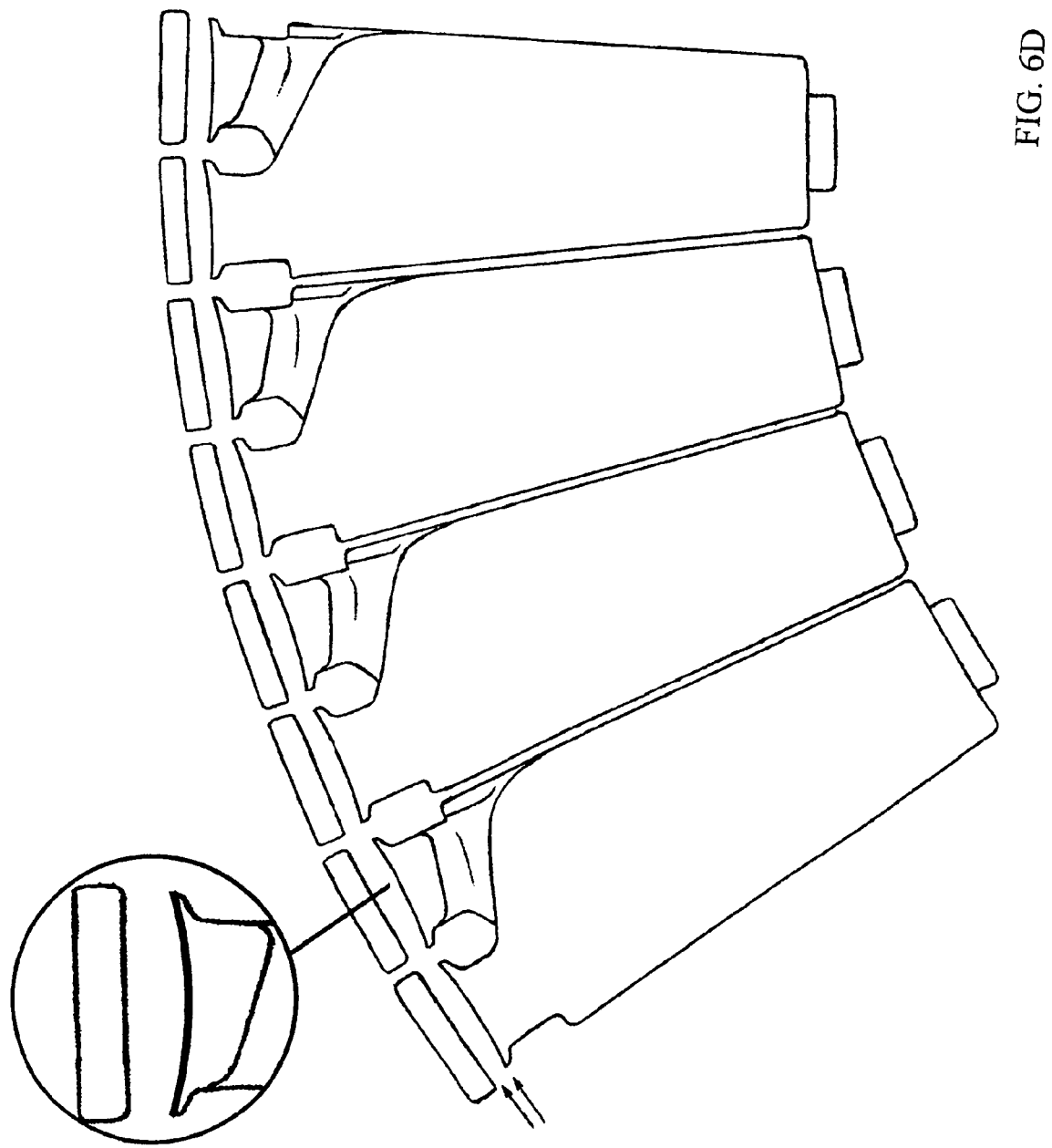
FIG. 6d is a side view of adjacent mated pole pieces and an exploded view showing the concave top surface of the pole pieces.
Figure 6E:
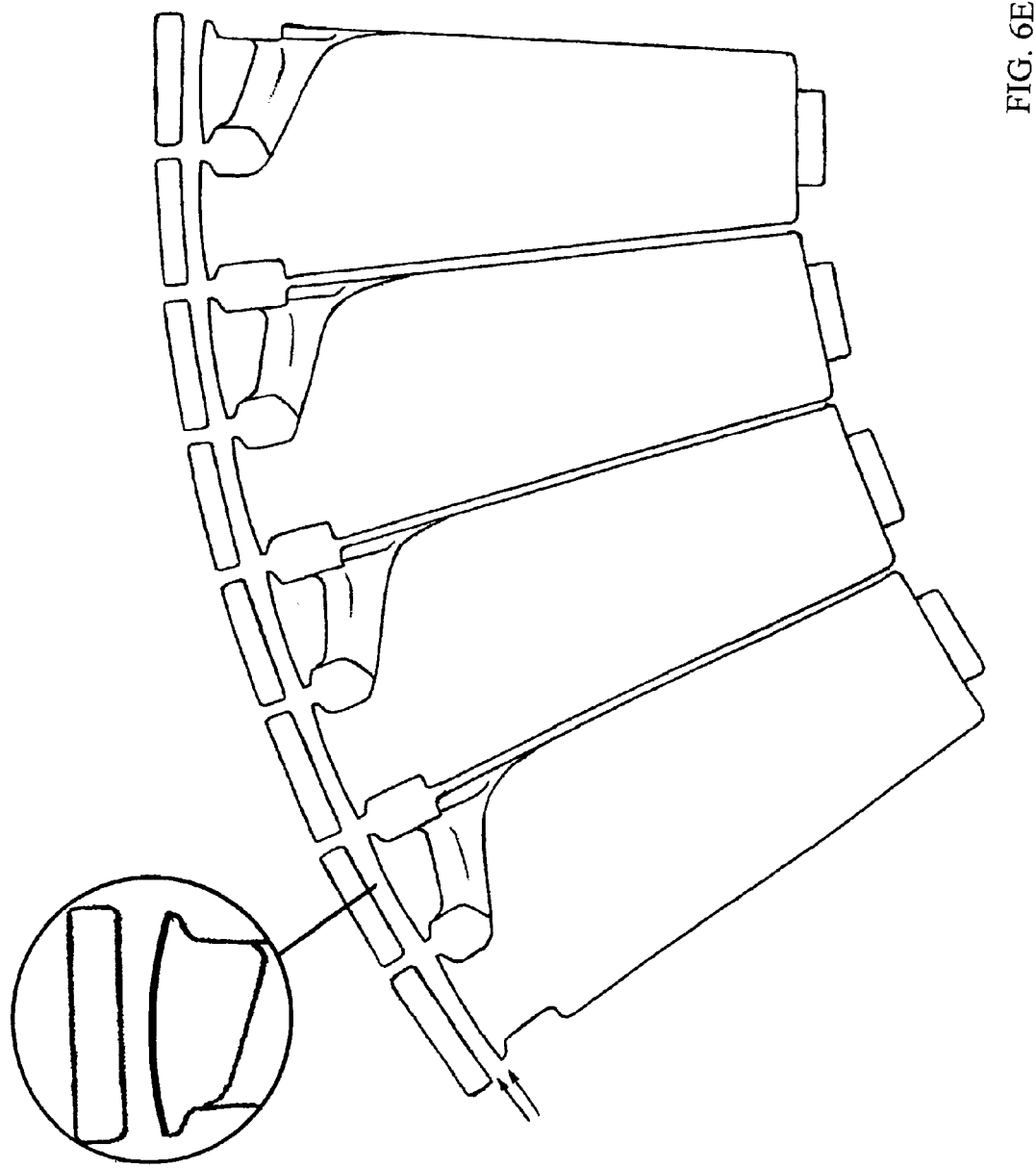
FIG. 6e is a side view of adjacent mated pole pieces and an exploded view showing the curved top surface of the pole pieces.

The top surface of the north and south pole pieces that are aligned with the permanent magnets is flat as shown in FIG. 6*c* or concave as shown in FIG. 6*d* in shape for a desired flux density to produce corresponding reverse electro motive force (reverse EMF) waveform as required when a square wave is applied to the transverse winding. When a sine wave is applied to the transverse winding, the top surfaces of the north and south pole pieces are curved as shown in FIG. 6*e*.

FIG. 6*a* is a side view of four consecutive parallel pole molded magnetic flux channels with transversely wound conductive wire being run through the winding tunnel and FIG. 6*b* is an exploded view showing the magnetic flux in the air gap between a mated north and south pole pieces formed by the undercut faces of the top portion of each of the north and south pole pieces. The work performed by this electric motor, whether as a dynamo or motor, occurs at the gap 180 between the permanent magnets and the stator electromagnets as shown in FIG. 1. It is important to transfer nearly all the magnetic flux from the air gap to the transverse winding without losses as a dynamo, and as a motor, it is also important to transfer nearly all the magnetic flux from the transverse winding to the air gap.

Unlike prior art conventional laminated designs which reduce eddy currents in one plane, the molded magnetic flux channel reduces eddy currents in all directions and planes resulting in a reduction in eddy current heat loss and increased efficiency. As shown in FIG. 6*b*, at the poles, (N-S-N-S) there is a gap between poles of opposite magnetic polarity, labeled "X". This air gap may be on the order of approximately 0.200 inches. Unavoidably, there is a loss of magnetic flux between the facing edges of the two opposite poles. To minimize this unavoidable loss, the edge width is made the minimum that can convey flux to or from the air gap with the permanent magnets.

Between the poles, the remainder of the interleaved opposite magnetic polarity member is undercut, so that the distance between opposite pole surfaces is approximately four (4) times the top opening between the poles faces to minimize the flux loss between opposite poles of the main body of the poles.

Because the magnetic flux loss decreases as the square of the distance between the surfaces, by undercutting the interleaved facing opposite magnetic polarity surfaces so that the distance in increased by a factor of approximately four, decreases the magnetic loss by a factor of approximately sixteen.

Transverse winding with molded magnetic flux channels reduce the assembly labor cost by approximately 80%, due to "snap together" construction of Molded Magnetic Flux Channel parallel pole pieces. Looking at the width of the main body of the molded magnetic flux channel, labeled as 20Y in FIG. 6*a*, the gap Y between the adjacent molded magnetic pole pieces is the minimum required for assembly. There is no magnetic loss in gap Y because the magnetic polarity of the main bodies of the molded-magnetic flux channels is approximately the same at any moment of time. The figures show each molded-magnetic flux channel body as "North" with the present direction of current flow in the transverse coil. Since the ratio of the assembly gap Y to the average width of the main body 20Y is at least approximately a 20 to 1 ratio, at least 95% of the available flux is either captured or coupled to the magnetic pole air gap. This compares to less than 50% with prior art.

With molded-magnetic flux channels, nearly all of the flux is captured from, or delivered to, the conductors of the transverse coil. Most prior art configurations leave approximately half of the windings exposed resulting in the exposed flux not being coupled to or focused at the air gap where the actual force is created.

Figures 7A, 7B:
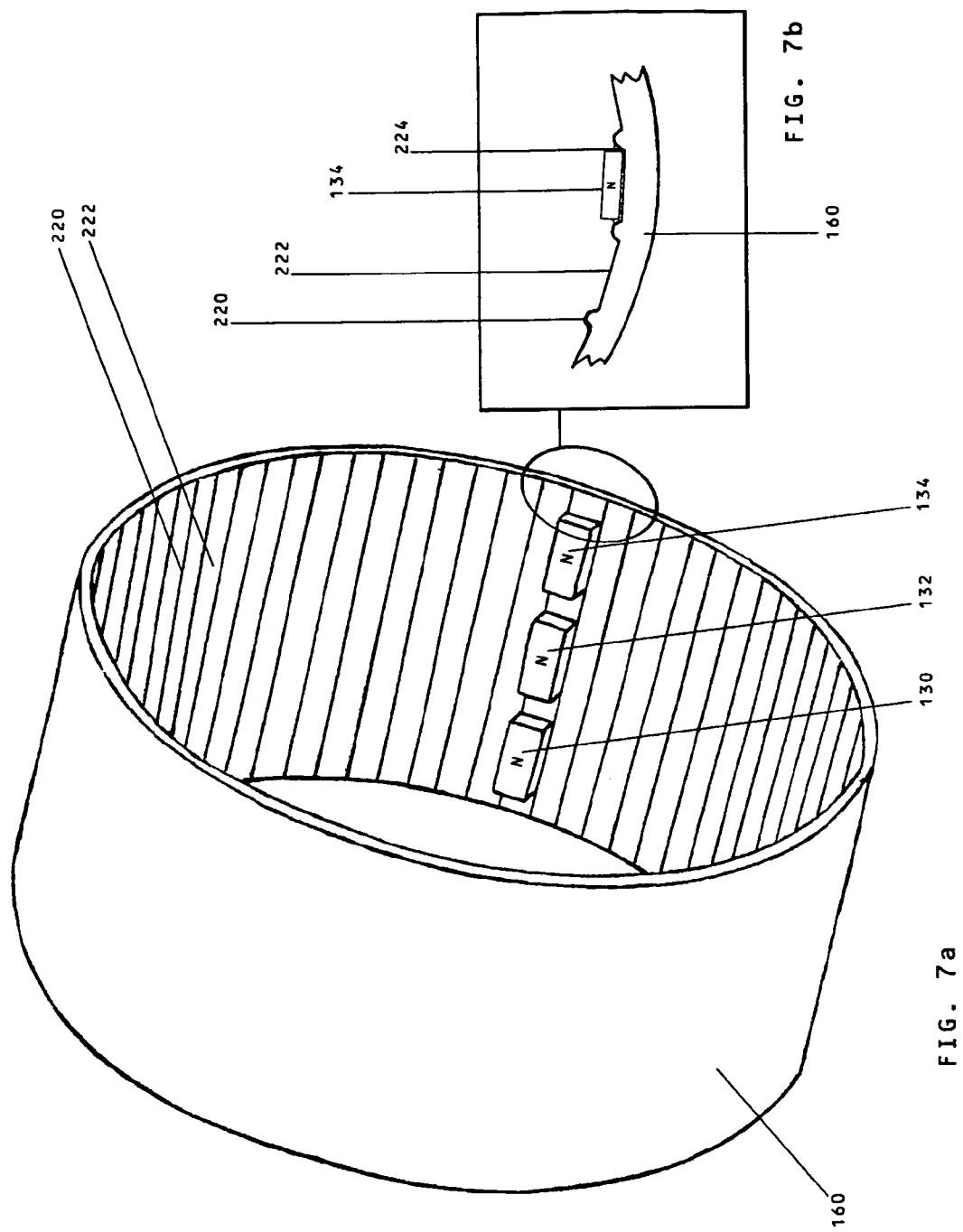
FIG. 7a shows the machining flat surfaces within the interior curved surface of the steel drum housing for attaching magnets.
FIG. 7b is a side view of a section of the curved magnetic drum with keying ridges between machined flat surfaces for positioning the permanent magnets.

FIG. 7a shows a machined flat surface 222 within the interior curved surface of the steel drum housing 160. As shown in FIG. 7b, keying ridges 220 are formed between the machined flat surfaces 222, which serve to precisely locate, key, and help attach the permanent magnets 134, by attachment with an epoxy type adhesive which in a preferred embodiment contains powdered iron. The adhesive is applied to the magnet mating surface and to the steel magnet housing surface prior to mating the permanent magnet 134 to its appropriate keyed location as shown in FIG. 7b. The exploded view shown in FIG. 7b is a close up of the normally curved inner surface 160 before and after the flat channel magnet-retaining channel 222 is machined, leaving the raised edges 220, which locate, key and attach the permanent magnets 134. This allows flat-sided magnets to be used, with shorter magnetic flux return path, allows stronger bond between magnets and housing, and mechanically keys the magnet into the precise alignment necessary for proper operation of the motor/dynamo.

High Torque Directly Driven Motor applications utilizing Molded Magnetic Flux Channels, Transverse Flux Stator Coils, a separate stator for each phase, Neodymium Iron Boron permanent magnets bonded with epoxy containing powered iron to axial mounting and alignment channels in rotating steel rotor drum according to the present invention provide performance with efficiencies up to 99%.

In the preferred embodiment of the present invention, the motor 100 is a medium size motor with torque of approximately 20,000 ft. lbs. (27,137 NM) although the advantages apply to motors in the mega watt MW range and as small as approximately 5 watts.

The present invention overcomes the problems with the prior art and provides a motor that achieves high efficiency, up to 99% has been demonstrated in experiments. The advantages of the novel motor includes near elimination of eddy current loses in stator; greatly reduced hysteresis losses in stator; significant reduction of conductor resistive (IR) losses; reduction of inductive losses; elimination of phase "armature effect" losses and previously required mechanical or hydraulic power transmission losses that were required by the prior art to achieve high torque with low RPM; and the motor of the present invention reduces complexity of the motor with a lower cost of construction of a Transverse Flux Motors.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A high efficiency direct drive high torque motor comprising:
    a non-rotating mounting shaft having a hollow channel and a bearing attached to each end of the mounting shaft;
    a cylindrical non-rotating hub having a hollow core for the non rotating mounting shaft;
    plural rows of adjacent plural Parallel Pole Molded Magnetic Flux Channels separated by a gap, each parallel pole molded magnetic flux channel consisting of a north pole piece and a south pole piece, a top portion of each pole piece having a width less than the width of a base portion and a length approximately double the length of the base portion for an approximately equal cross sectional area to decrease magnetic flux leakage and fringing, the north pole piece and a south pole piece mate to form a hollow winding channel, the plural parallel pole molded magnetic flux channels fixedly attached on a cylindrical surface of the cylindrical hub, each row of plural parallel pole molded magnetic flux channels corresponding to one phase of the motor to increase magnetic flux and magnetic flux area for increasing torque;
    a phase transverse winding passing through the row of plural parallel pole magnetic flux channels forming a stator corresponding to the phase to reduce inductive loss;
    a rotating drum having plural rows permanent magnets on an inner surface, each row corresponding to and aligned with one row of parallel pole molded magnetic flux channels, the rotating drum connected with the bearing to allow the row of permanent magnets to rotate around the cylindrical hub; and
    drive electronics for driving the phase winding by supplying an alternating current when the current through the transverse winding reverses, the magnetic polarity of the mated north and south pole pieces switch, wherein the plural molded magnetic flux channels are timed to increase torque and motor efficiency of the direct drive motor.

2. The motor of claim 1, wherein the motor includes at least three phases, the motor comprising:
    at least three rows of plural Parallel Pole Molded Magnetic Flux Channels fixedly attached on the cylindrical surface of the cylindrical hub, each row of plural parallel pole molded magnetic pieces corresponding to one phase of the motor;
    at least three phase transverse winding passing through the at least three rows of plural parallel pole magnetic flux channels forming the stator; and
    at least three rows of plural permanent magnets on the rotating drum.

3. The motor of claim 2, wherein each stator corresponding to one phase is physically located in a different plane and is spaced at 120 electrical degrees for a three phase motor to reduce magnetic distortion resulting in increased efficiency at high speeds.

4. The motor of claim 1, wherein the cylindrical hub comprises:
    a plurality of disks forming the cylindrical hub, wherein each adjacent disk corresponds to one phase of the motor, the discs combined into one cylindrical hub.

5. The motor of claim 4, wherein the drive electronics includes a motor full bridge power circuit for driving each phase stator winding separately with one of a square wave, a sine wave, a trapezoidal waveform, or a combination thereof.

6. The motor of claim 1, wherein the cylindrical non-rotating hub comprises:
    a cylindrical hub consisting of a magnetically inert material to eliminate hysteresis losses, reduce weight, increase insulation resistance and reduce electromagnetic interference.

7. The motor of claim 1, wherein each parallel pole molded magnetic flux channels comprises:
    a mating north pole piece and a south pole piece to form the channel for the transverse winding, said poles reversing magnetically with reversed transverse coil current.

8. The motor of claim 7, wherein the mated north and south pole pieces further comprise:

a locating key on the exterior bottom portion of each of the plural molded magnetic flux channels;

plural corresponding locating holes on the outer circumference of the cylindrical hub for precise positioning the plural molded magnetic flux channels.

9. The motor of claim 7, wherein the mated north and south pole pieces form an air gap between the upper north and south pole pieces, the distance between interior interleaved opposing surfaces of the north and south magnetic body members forming the channel being approximately four times larger than the air gap between the upper north and south pole pieces.

10. The motor of claim 7, wherein the interior facing surfaces between the north and south pole pieces have undercut faces to reduce magnetic leakage between pole pieces.

11. The motor of claim 7, wherein the top portion of the north and south pole pieces is one of a flat or concave shape for a desired flux density to produce corresponding reverse electro motive force (reverse EMF) waveform as required when a square wave is applied to the transverse winding.

12. The motor of claim 7, wherein the top portion of the north and south pole pieces is curved for a desired flux density producing corresponding reverse EMF waveform as required when a sine wave is applied to the transverse winding.

13. The motor of claim 7, wherein a shape of the molded-magnetic flux channel body maximizes the magnetically conducting area of the magnetic conducting body members by increasing a length when a width is decreased while maintaining a nearly constant cross-sectional area to reduce magnetic flux saturation, leakage and fringing.

14. The motor of claim 1, wherein the transverse winding comprises:

a transverse winding having at least two terminals, wherein the transverse flux winding has lower inductance and resistance for higher efficiency at high speeds.

15. The motor of claim 1, wherein the transverse winding comprises:

one of a cooper and an aluminum transverse winding.

16. The motor of claim 1, wherein the drive electronics comprises:

one of a Wye connection, Star connection or Delta connection for driving the motor, with phase timing current advance and pulse shape modification to improve efficiency and high speed operation.

17. The motor of claim 1, wherein each row of permanent magnets comprises:

one single row of plural adjacent permanent magnets alternating north and south poles coupled with one row of parallel pole molded magnetic flux channels and corresponding to one phase to improve motor efficiency and to reduce stray magnetic fluxes.

18. The motor of claim 17, wherein each one single row of plural adjacent permanent magnets comprises:

plural flat adjacent permanent magnets; and an epoxy containing powdered iron for attaching the plural flat permanent magnets to the rotating drum to reduce the magnetic air gap between the plural permanent magnets and the inner surface of the rotating drum.

19. The motor of claim 1, further comprising:

a tubeless tire mounted on the circumference of an outer surface of the rotating drum to form a wheel motor.

20. The motor of claim 1, further comprising:

a track driving surface mounted on the circumference of an outer surface of the rotating drum to form a track wheel motor.

21. The motor of claim 1, wherein the motor is used as a high efficiency synchronous motor or dynamo.

22. The motor of claim 1, wherein the motor is used as one of an augers, elevator motors and garage door motors requiring high torque at low RPM without gearboxes.

23. The motor of claim 1, wherein the motor is used as a direct drive high efficiency wind turbine generator or dynamo.

24. The motor of claim 1, wherein each the phase winding comprises:

dual, identical transverse windings in each stator phase allowing dual voltage operation, and also allowing series start, parallel run operation utilizing connection switching in either motor or dynamo mode.

25. The motor of claim 1, wherein each phase winding comprises:

dual, identical transverse windings in each stator phase allow dual voltage operation in wind turbine dynamo applications to permit direct connections to rectifying diodes to yield dual voltages for different wind conditions.

26. The motor of claim 1, wherein each transverse winding comprises:

transverse wound locomotive wire, allowing fewer turns, higher amperages, with more flexible wire for easier construction and higher efficiency.

27. The motor of claim 1, wherein the rotating drum comprises:

plural machined flat areas on a curved inner surface of the rotating drum; and plural protrusions of non machined material between adjacent flat areas as alignment ridges for keying and holding in precise alignment said plural permanent magnets.

28. The motor of claim 1, wherein the wherein the motor includes one single phase, the motor comprising:

one single row of plural Parallel Pole Molded Magnetic Flux Channels fixedly attached on the cylindrical surface of the cylindrical hub to the one phase of the motor;

one single transverse winding passing through the one single row of plural parallel pole magnetic flux channels forming the stator; and one single row of plural permanent magnets on the rotating drum.

29. The motor of claim 1, wherein the ratio of the width of the gap between adjacent parallel pole magnetic flux channels to the width of the bottom of the magnetic flux channel is at least approximately twenty a 20 to 1 ratio.

30. The motor of claim 29 wherein the interior surface of the upper portion of each pole piece diagonally undercut to form a hollow space between an interior top section of the north and south pole piece of approximately four times the distance between the north and south top surfaces.

31. A high efficiency direct drive high torque motor comprising:

a non-rotating mounting shaft having a hollow channel and a bearing attached to each end of the mounting shaft;

a cylindrical non-rotating hub having a hollow core for the non rotating mounting shaft;

plural rows of adjacent plural Parallel Pole Molded Magnetic Flux Channels separated by a gap, each parallel pole molded magnetic flux channel consisting of a north pole piece and a south pole piece that mate to form an air gap between the upper portion of the north pole piece and the upper portion of the south pole piece a hollow winding channel, the plural parallel pole molded magnetic flux channels fixedly attached on a cylindrical surface of the cylindrical hub, each row of plural parallel pole molded magnetic flux channels corresponding to one phase of the motor to increase magnetic flux and magnetic flux area for increasing torque;

a phase transverse winding passing through the row of plural parallel pole magnetic flux channels forming a stator corresponding to the phase to reduce inductive loss;

a rotating drum having plural rows permanent magnets on an inner surface, each row corresponding to and aligned with one row of parallel pole molded magnetic flux channels, the rotating drum connected with the bearing to allow the row of permanent magnets to rotate around the cylindrical hub; and drive electronics for driving the phase winding, wherein the plural molded magnetic flux channels are timed to increase torque and motor efficiency.

32. A high efficiency direct drive high torque motor comprising:

a non-rotating mounting shaft having a hollow channel and a bearing attached to each end of the mounting shaft;

a cylindrical non-rotating hub having a hollow core for the non rotating mounting shaft;

plural rows of adjacent plural Parallel Pole Molded Magnetic Flux Channels separated by a gap, each parallel pole molded magnetic flux channel consisting of a north pole piece and a south pole piece that mate to form a hollow winding channel, the interior surface of the upper portion of each pole piece diagonally undercut to form a hollow space between an interior top section of the north and south pole piece of approximately four times the distance between the top north and top south pole surfaces for an approximately equal cross sectional area from the bottom to the top, the plural parallel pole molded magnetic flux channels fixedly attached on a cylindrical surface of the cylindrical hub, each row of plural parallel pole molded magnetic flux channels corresponding to one phase of the motor to increase magnetic flux and magnetic flux area for increasing torque;

a phase transverse winding passing through the row of plural parallel pole magnetic flux channels forming a stator corresponding to the phase to reduce inductive loss;

a rotating drum having plural rows permanent magnets on an inner surface, each row corresponding to and aligned with one row of parallel pole molded magnetic flux channels, the rotating drum connected with the bearing to allow the row of permanent magnets to rotate around the cylindrical hub; and drive electronics for driving the phase winding, wherein the plural molded magnetic flux channels are timed to increase torque and motor efficiency.

* * * * *